United States Patent [19]
Tsukamoto et al.

[11] Patent Number: 5,772,553
[45] Date of Patent: Jun. 30, 1998

[54] CONTROL SYSTEM FOR AUTOMATIC TRANSMISSION

[75] Inventors: Kazumasa Tsukamoto, Toyota; Masahiro Hayabuchi, Anjo; Yoshihisa Yamamoto, Nishio; Hiroshi Tsutsui, Nishio; Yuuki Kousaka, Nishio, all of Japan

[73] Assignee: Aisin AW Co., Ltd., Japan

[21] Appl. No.: 708,077

[22] Filed: Aug. 30, 1996

[30] Foreign Application Priority Data

Aug. 31, 1995 [JP] Japan .................................... 7-224311

[51] Int. Cl.⁶ .............................................. F16H 61/20
[52] U.S. Cl. .............................................. 477/95; 477/92
[58] Field of Search .................................... 477/92, 93, 95

[56] References Cited

U.S. PATENT DOCUMENTS 4,576,265  3/1986  Kumura et al. ............................ 477/95
4,709,792  12/1987  Sakai .
4,718,525  1/1988  Yamaguchi .

FOREIGN PATENT DOCUMENTS 60-60351  of 1985  Japan .

*Primary Examiner*—Dirk Wright
*Attorney, Agent, or Firm*—Lorusso & Loud

[57] ABSTRACT

A control system for an automatic transmission includes a clutch adapted to be applied when a forward running range is selected, for transmitting the rotation of an engine to a speed change unit. A hydraulic servo applies the clutch responsive to feed of an oil pressure and a control unit controls the oil pressure fed to the hydraulic servo. The control unit brings the clutch into a substantially released state by lowering the oil pressure of the hydraulic servo if the stop state of a vehicle is detected by a stop state detector and applies the clutch if the stop state of the vehicle is not detected with the clutch released. The oil pressure fed to the hydraulic servo is raised according to a second mode when the accelerator pedal is depressed, in preference to a first mode in which a brake pedal is released, if the accelerator pedal is depressed when the stop state of the vehicle is not detected because the accelerator pedal is released so that the engagement of the clutch has not started.

4 Claims, 21 Drawing Sheets

FIG. 3

|   |   | Solenoid | | | Clutch | | | Brake | | | | One-Way Clutch | | |
|---|---|----|----|----|----|----|----|----|----|----|----|----|----|----|
|   |   | S1 | S2 | S3 | C1 | C2 | C3 | B1 | B2 | B3 | B4 | F1 | F2 | F3 |
| R |   | × | ○ | × | × | ○ | × | × | × | ○ | ○ | × | × | × |
| N |   | × | ○ | × | × | × | × | × | × | × | ○ | × | × | × |
| D | 1ST | × | ○ | △ | ○ | × | × | × | × | (○) | ○ | × | ○ | ○ |
|   | 2ND | ○ | ○ | △ | ○ | × | × | ○ | ○ | × | ○ | ○ | × | ○ |
|   | 3RD | ○ | × | × | ○ | × | ○ | ○ | ○ | × | × | ○ | × | × |
|   | 4TH | × | × | × | ○ | ○ | ○ | × | ○ | × | × | × | × | × |

CONTROL SYSTEM FOR AUTOMATIC TRANSMISSION

BACKGROUND OF THE INVENTION

1. Field of the Invention

The present invention relates to a control system for an automatic transmission.

2. Related Art

In the automatic transmission of the prior art, rotation output from the engine is transmitted through a fluid transmission unit, such as a torque converter, to a speed change unit, in which its speed is changed. Between the fluid transmission unit and the speed change unit is arranged a first clutch (or input clutch) which can be applied/released for shifting between a neutral range (hereinafter "N-range") and a forward running range (hereinafter "D-range").

In the prior art automatic transmission, when the D-range is selected with the vehicle speed at zero, the accelerator pedal released and the brake pedal depressed, neutral control is effected by lowering the oil pressure of the hydraulic servo to release the first clutch so that the load on the engine is lightened to improve the fuel economy and to prevent vibration of the vehicle.

When the first clutch is applied to start the vehicle, delay in the engagement of the first clutch is prevented by making the rise in oil pressure of the hydraulic servo for the case wherein only the accelerator pedal is depressed while the remaining conditions are unchanged (hereinafter "stall state") faster than the rise in the oil pressure of the hydraulic servo for the case wherein only the brake pedal is released but the remaining conditions are unchanged (hereinafter "idle state").

Specifically, in the idle state, as the brake pedal is released to start the rise in the oil pressure of the hydraulic servo, the engagement of the first clutch is started. Therefore, a delay in the engagement of the first clutch when the accelerator pedal is depressed is without consequence.

In the stall state, on the contrary, as the accelerator pedal is depressed to start the rise in the oil pressure of the hydraulic servo, the engagement of the first clutch is started. If a delay occurs in the engagement of the first clutch, the engine RPM will have risen as the accelerator pedal is depressed when the engagement of the first clutch is started. As a result, application shock results from the delay in the engagement of the first clutch. In the stall state, therefore, the rise in the oil pressure of the hydraulic servo is accelerated to prevent the delay in the engagement of the first clutch, as disclosed in Japanese Patent Publication No. 75431/1992.

In the aforementioned automatic transmission of the prior art, however, if the accelerator pedal is depressed with a slight delay after the brake pedal has been released, the engine RPM may have risen before the engagement of the first clutch is started. In this case, the delay in the engagement results in clutch application shock.

The present invention has, as its objectives, solution of the problems of the aforementioned prior art control system and provision of a control system for an automatic transmission, which is free of any delay in the engagement of a clutch, regardless of any operation by the driver, to thereby prevent the occurrence of the clutch application shock.

SUMMARY OF THE INVENTION

Therefore, the present invention provides a control system for an automatic transmission including a clutch, applied when a forward running range is selected, for transmitting the rotation of an engine to a speed change unit, a hydraulic servo for applying the clutch responsive to feed of an oil pressure and a control unit for controlling the oil pressure fed to the hydraulic servo.

The control unit includes stop state detecting means for detecting a stop state for the vehicle, defined as being established when the vehicle speed is substantially zero, the accelerator pedal is released and the brake pedal is depressed. The control unit further includes release means for bringing the clutch into a substantially released state by lowering the oil pressure of the hydraulic servo when the vehicular stop state is detected, application means for applying the clutch when the vehicular stop state is not detected while the clutch is released and engagement start detecting means for detecting whether or not the engagement of the clutch has started.

If the forward running range is selected, if the accelerator pedal is released and if the brake pedal is depressed, the stop state of the vehicle is detected by the stop state detecting means, and the release means lowers the oil pressure of the hydraulic servo to bring the clutch into a substantially released state.

The application means raises the oil pressure to be fed to the hydraulic servo, according to a first mode, if the vehicular stop state is not detected because the brake pedal and the accelerator pedal are both released. The application means also raises the oil pressure to the hydraulic servo according to a second mode, with the rate of increase in the oil pressure being higher than the rate of increase in the first mode, if the vehicular stop state is not detected because of depression of the accelerator pedal, and according to the second mode in preference to the first mode if the vehicular stop state is not detected because the brake pedal and the accelerator pedal are both released and the accelerator pedal is then depressed while it is detected that the engagement of the clutch has not started.

When the vehicle is started from the idle state, the oil pressure fed to the hydraulic servo is gently raised according to the first mode. When the vehicle is started from the stall state, on the other hand, the oil pressure to be fed to the hydraulic servo is quickly raised according to the second mode. As a result, delay in engagement of the clutch and, consequently, application shock can be prevented.

Moreover, if the accelerator pedal is depressed with a slight delay after the brake pedal has been released, the oil pressure fed to the hydraulic servo is raised according to the second mode in preference to the first mode so that it is raised more quickly when the accelerator pedal is depressed. As a result, delay in engagement of the clutch can be eliminated to prevent application shock.

Thus, delay in engagement of the clutch can be eliminated no matter how the driver might operate the brake pedal and the accelerator pedal, with prevention of application shock.

According to another aspect of the present invention, the engagement start detecting means decides that the engagement of the clutch has not started, if the time elapsed from the start of the feed of the oil pressure to the hydraulic servo has not reached the time predetermined (set) to correspond to start of the engagement of the clutch.

In this case, the period after the brake pedal has been released and before the engagement of the clutch is started is remarkably short, but it can be detected by the timer that the engagement of the clutch is not started. As a result, not only the structure of the control system for an automatic transmission can be simplified, but also there is no delay in the detection. Moreover, it can be accurately decided whether or not the engagement of the clutch is started.

In yet another aspect of the present invention, in a first mode, a constant shelf pressure is generated by the time the engagement of the clutch has started, and the oil pressure is then raised at a constant gradient, and in a second mode, a shelf pressure higher than that of the first mode is generated, and the oil pressure is then raised at a constant gradient.

Delay in engagement of the clutch can be prevented by suitably raising the shelf pressure, and the oil pressure fed to the hydraulic servo is then gradually raised from the level of the shelf pressure. As a result, after the engagement of the clutch has started, the oil pressure can be gently raised in either mode so that the engagement of the clutch is smooth.

In still another aspect of the present invention, the shelf pressures of the first mode and of the second mode are increased with increase in throttle opening, and the gradients of rise in the oil pressures of the first mode and the second mode are made steeper as the throttle opening increases. In this case, the clutch can be applied in a manner to correspond to the magnitude of the input torque. As a result, not only is delay in engagement prevented with engagement corresponding to the magnitude of the input torque, but also application shock can be prevented.

BRIEF DESCRIPTION OF THE DRAWINGS

FIG. 3 is a table enumerating the operations of the automatic transmission illustrated in FIG. 2;

DESCRIPTION OF THE PREFERRED EMBODIMENT

Figure 1:
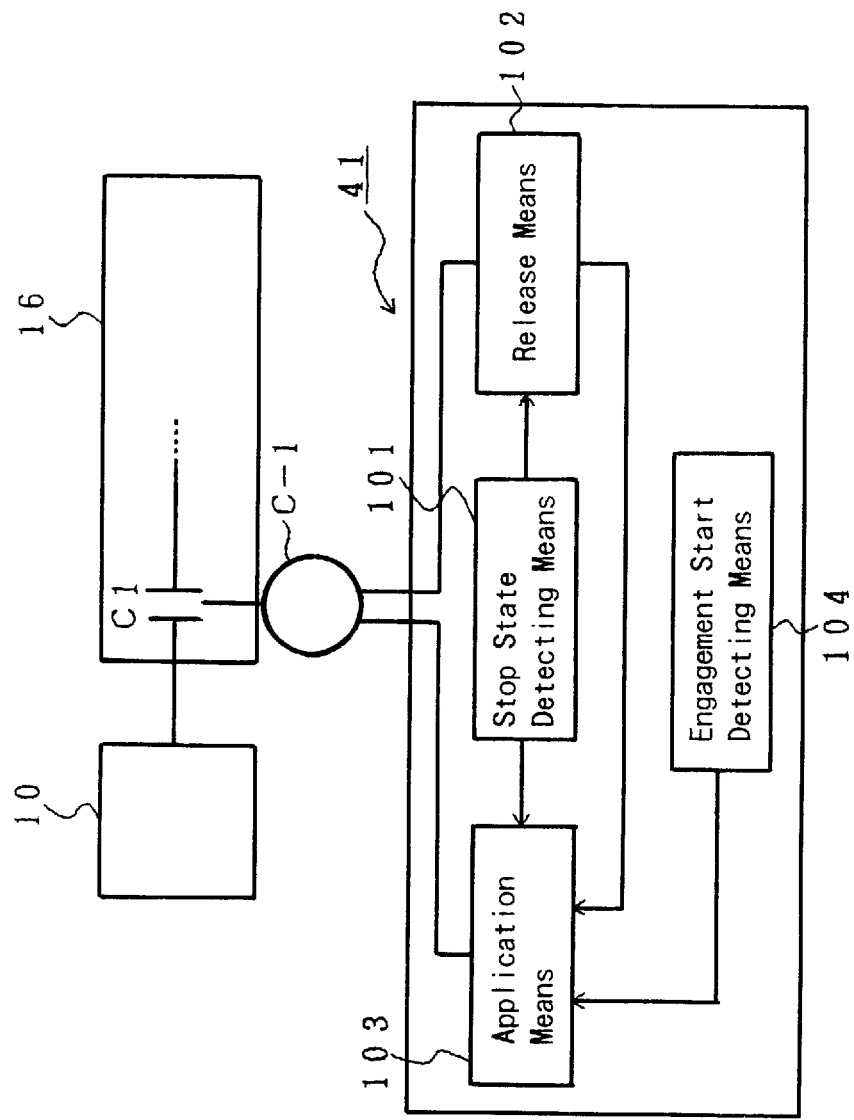
FIG. 1 is a block diagram of an embodiment of a control system of an automatic transmission in accordance with the present invention.

In FIG. 1 reference numeral 10 designates an engine; numeral 16 designates a speed change unit; and C1 designates a first clutch, i.e. the clutch applied when D-range is selected, for transmitting the rotation of the engine 10 to the speed change unit 16. Further, C-1 designates a hydraulic servo for applying/releasing the first clutch C1.

Control unit 41 receives a stop signal from stop state detecting means 101 when the vehicle speed is substantially zero, the accelerator pedal (not shown) is released and the brake pedal (not shown) is depressed. Release means 102 operates to release the first clutch C1 by lowering the oil pressure of the hydraulic servo C-1 when the stop state of the vehicle is detected. Application means 103 applies the first clutch C1 when the stop state of the vehicle is not detected during the operation of the release means 102; and engagement start detecting means 104 detects whether or not the engagement of the first clutch C1 has started.

The application means 103 raises the oil pressure to be fed to the hydraulic servo C-1, according to a first mode, if the vehicle stop state is not detected because the brake pedal is released with the accelerator pedal released. The application means 103 raises the oil pressure to the hydraulic servo C-1 according to a second mode, at a rate higher than that at which the oil pressure is raised in the first mode, if the vehicular stop state is not detected because the accelerator pedal is depressed. Finally, the oil pressure is raised according to the second mode, in preference to the first mode, if the vehicular stop state is not detected because both the brake pedal and the accelerator pedal are released and if the accelerator pedal is depressed while it is detected that the engagement of the clutch C1 has not started.

Figure 2:
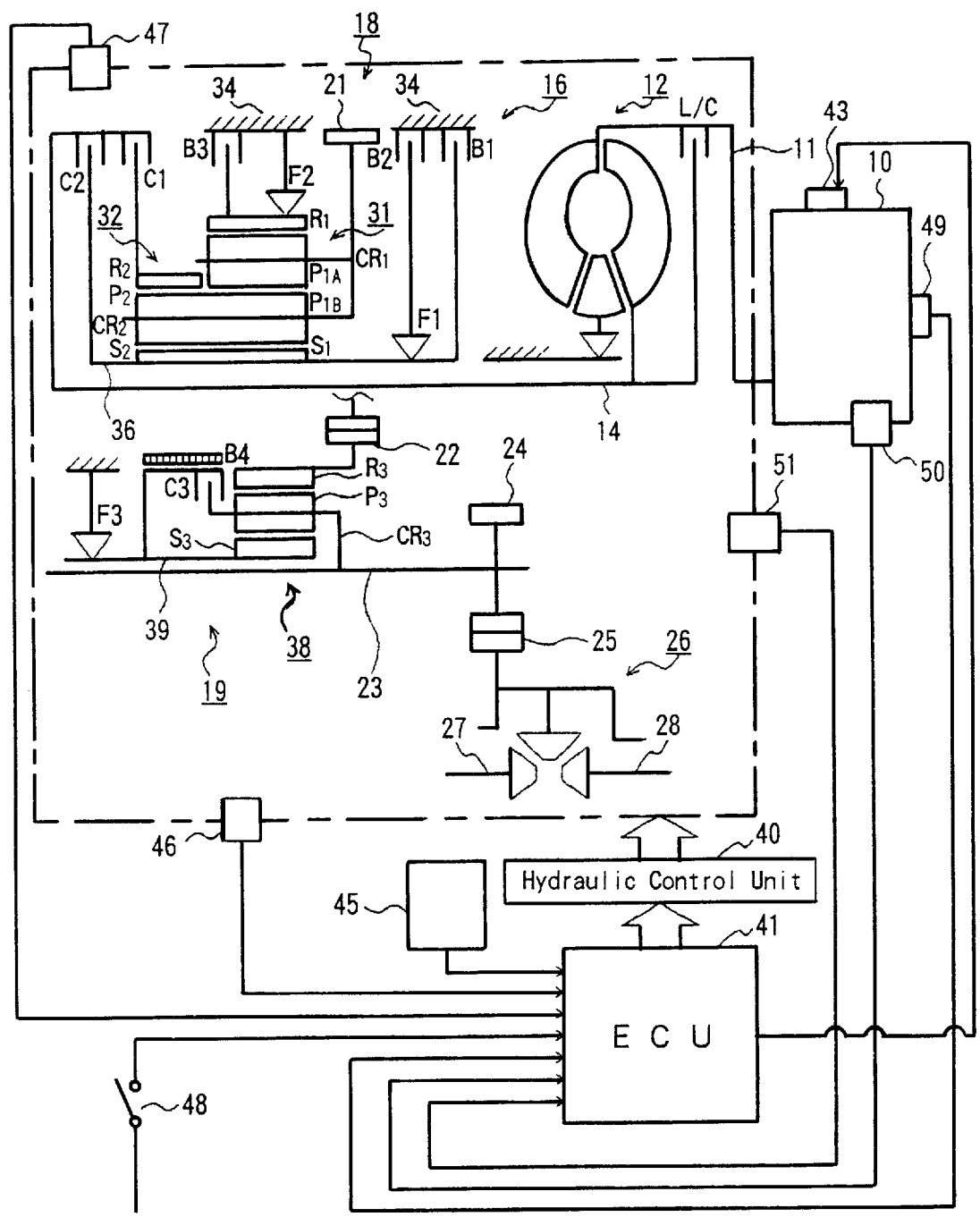
FIG. 2 is a schematic diagram of an automatic transmission to which the control system of FIG. 1 is applied.

As shown in FIG. 2, the rotation generated by the engine 10 is transmitted through an output shaft 11 to the torque converter 12. The torque converter 12 transmits the rotation of the engine 10 to an output shaft 14 either through a fluid (or working oil) or directly to the output shaft 14 when the vehicle speed exceeds a predetermined value by applying a lockup clutch L/C.

The output shaft 14 is connected to speed change unit 16 which has the capability of establishing four forward and one reverse speed. This speed change unit 16 includes a main transmission 18 for establishing three forward and one reverse speeds and an under-drive auxiliary transmission 19. The rotation of the main transmission 18 is transmitted through a counter drive gear 21 and a counter driven gear 22 to the auxiliary transmission 19, and the rotation of the output shaft 23 of the auxiliary transmission 19 is transmitted through an output gear 24 and a ring gear 25 to a differential mechanism 26.

In the differential mechanism 26, the rotation, as received through the output gear 24 and the ring gear 25, is differentiated so that the differential rotations are transmitted through left-hand and right-hand drive shafts 27 and 28 to the drive wheels (not shown).

The main transmission 18 includes a first planetary gear unit 31 and a second planetary gear unit 32. Also included are the first clutch C1, a second clutch C2, a first brake B1, a second brake B2, a third brake B3 and one-way clutches F1 and F2 for transmitting the torque selectively between the individual elements of the first planetary gear unit 31 and the second planetary gear unit 32.

The first planetary gear unit 31 is composed of: a ring gear $R_1$, connected to a drive unit casing 34 through the third brake B3 and the one-way clutch F2 which are arranged in parallel with each other; a sun gear $S_1$, formed on a sun gear shaft 36 fitted on and rotatably supported by the output shaft 14; a carrier $CR_1$, connected to the counter drive gear 21; and pinions $P_{1A}$, and $P_{1B}$ meshing between the ring gear $R_1$ and the sun gear $S_1$ and rotatably supported by the carrier $CR_1$.

The sun gear shaft 36 is connected through the second clutch C2 to the output shaft 14. The sun gear shaft 36 is further connected through the first brake B1 to the drive unit casing 34 and through the one-way clutch F1 and the second brake B2, arranged in series, to the drive unit casing 34.

On the other hand, the second planetary gear unit 32 is composed of: a ring gear $R_2$ connected through the first clutch C1 to the output shaft 14; a sun gear $S_2$ formed on the sun gear shaft 36 integrally with the sun gear S1; a carrier $CR_2$ connected to the carrier $CR_1$; and a pinion P2 meshed between the ring gear $R_2$ and the sun gear $S_2$, rotatably supported by the carrier $CR_2$ and formed integrally with the pinion $P_{1B}$.

The counter drive gear 21 is meshed with the counter driven gear 22 in the auxiliary transmission 19, to transmit the rotation, at a speed established by the main transmission 18, to the auxiliary transmission 19.

This auxiliary transmission 19 is equipped with a third planetary gear unit 38 and with a third clutch C3, a fourth brake B4 and a one-way clutch F3 for transmitting the torque selectively between the individual elements of the third planetary gear unit 38.

The third planetary gear unit 38 is composed of: a ring gear $R_3$ connected to the counter driven gear 22; a sun gear $S_3$ formed on a sun gear shaft 39 which, in turn, is rotatably fitted on the output shaft 23; a carrier $CR_3$ fixed on the output shaft 23; and a pinion $P_3$ meshed between the ring gear $R_3$ and the sun gear $S_3$ and rotatably supported by the carrier $CR_3$.

Operations of the above-described automatic transmission are summarized in the table of FIG. 3 in which S1 designates a first solenoid valve, S2 designates a second solenoid valve, S3 designates a third solenoid valve; C1 designates the first brake, C2 designates the second clutch, C3 designates the third clutch, B1 designates the first brake, B2 designates the second brake, B3 designates the third brake, B4 designates the fourth brake and F1 to F3 designate the one-way clutches. Letter R designates a reverse running range, letter N designates an N-range and letter D designates a D-range. 1ST designates a 1st-speed gear stage, 2ND designates a 2nd-speed gear stage, 3RD designates a 3rd-speed gear stage and 4TH designates a 4th-speed gear stage.

Moreover, symbol ○ indicates "ON" for a first solenoid signal $S_1$, a second solenoid signal $S_2$ and a third solenoid signal $S_3$ for opening/closing the first solenoid valve S1, the second solenoid valve S2 and the third solenoid valve S3, respectively, application of the first clutch C1, the second clutch C2, the third clutch C3, the first brake B1, the second brake B2, the third brake B3 and the fourth brake B4 and a locked state for one-way clutches F1 to F3. On the other hand, symbol X indicates "OFF" for the first solenoid signal $S_1$, the second solenoid signal S2 and the third solenoid signal $S_3$ for opening/closing the first solenoid valve S1, the second solenoid valve S2 and the third solenoid valve S3 and release of the first clutch C1, the second clutch C2, the third clutch C3, the first brake B1, the second brake B2, the third brake B3, the fourth brake B4 and the one-way clutches F1 to F3.

Symbol A indicates a component which is turned ON/OFF in neutral, and symbol (○) indicates that the third brake B3 is applied for engine braking.

At the 1st speed in the D-range, the first clutch C1 and the fourth brake B4 are applied to lock the one-way clutches F2 and F3. The rotation of the output shaft 14 is then transmitted through the first clutch C1 to the ring gear $R_2$. In this state, the rotation of the ring gear $R_1$ is blocked by the one-way clutch F2 so that the rotation of the carrier $CR_2$ is drastically decelerated and transmitted to the counter driven gear 21 while idly rotating the sun gear $S_2$.

The rotation, as transmitted from the counter drive gear 21 to the counter driven gear 22, is transmitted to the ring gear $R_3$ However, the rotation of the sun gear $S_3$ is blocked by the fourth brake B4 so that the rotation of the carrier $CR_3$ is further decelerated and transmitted to the output shaft 23.

At the 2nd speed in the D-range, on the other hand, the first clutch C1, the first brake B1, the second brake B2 and the fourth brake B4 are applied to lock the one-way clutches F1 and F3. The rotation of the output shaft 14 is then transmitted through the first clutch C1 to the ring gear $R_2$. The rotation of this ring gear $R_2$ is decelerated and transmitted to the carrier $CR_2$, because the rotation of the sun gear $S_2$ is blocked by the second brake B2 and the one-way clutch F1. The rotation of the carrier $CR_2$ is transmitted to the counter drive gear 21 while idly rotating the ring gear $R_1$.

The rotation, as transmitted from the counter drive gear 21 to the counter driven gear 22, is transmitted to the ring gear $R_3$. However, the rotation of the sun gear $S_3$ is blocked by the fourth brake B4 so that the rotation of the carrier $CR_3$ is decelerated and transmitted to the output shaft 23.

Next, at the 3rd speed in the D-range, the first clutch C1, the third clutch C3, the first brake B1 and the second brake B2 are applied to lock the one-way clutch F1. Then, the rotation of the output shaft 14 is transmitted through the first clutch C1 to the ring gear $R_2$. The rotation of this ring gear $R_2$ is decelerated and transmitted to the carrier $CR_2$ because the rotation of the sun gear $S_2$ is blocked by the second brake B2 and the one-way clutch F1. The rotation of the carrier $CR_2$ is transmitted to the counter drive gear 21 while idly rotating the ring gear $R_1$.

The rotation, as transmitted from the counter drive gear 21 to the counter driven gear 22, is transmitted to the ring gear $R_3$. However, relative rotation between the carrier $CR_3$ and the sun gear $S_3$ is blocked by the third clutch C3 so that the third planetary gear unit 38 comes into a direct-coupled state. As a result, the rotation of the counter driven gear 22 is transmitted without speed change to the output shaft 23.

Next, at the 4th speed in the D-range, the first clutch C1, the second clutch C2, the third clutch C3 and the second brake B2 are applied. Then, the rotation of the output shaft 14 is transmitted through the first clutch C1 to the ring gear $R_2$ and through the second clutch C2 to the sun gear $S_2$ to bring the first planetary gear unit 31 and the second planetary gear unit 32 into direct-coupled states. As a result, the rotation of the output shaft 11 is transmitted without change in speed to the counter drive gear 21.

The rotation, as transmitted from the counter drive gear 21 to the counter driven gear 22, is transmitted to the ring gear $R_3$. However, relative rotation between the carrier $CR_3$ and the sun gear $S_3$ is blocked by the third clutch C3 so that the third planetary gear unit 38 comes into the direct-coupled state. As a result, the rotation of the counter driven gear 22 is transmitted without change in speed to the output shaft 23.

Hydraulic control unit 40 controls shifting between the individual gear stages by applying/releasing the first clutch C1, the second clutch C2, the third clutch C3, the first brake B1, the second brake B2, the third brake B3 and the fourth brake B4.

An engine control unit 43 is also provided for control of the engine 10.

Both the hydraulic control unit 40 and the engine control unit 43 are connected to the automatic transmission control system (ECU) 41 so that they are operated according to the control program of the automatic transmission control system 41. This automatic transmission control system 41 receives signals from a neutral start switch 45, an oil temperature sensor 46, a RPM sensor 47, a brake switch 48, an engine RPM sensor 49, a throttle opening sensor 50 and a vehicle speed sensor 51.

The shift position of the shift lever (not shown), i.e., the selected range, is detected by the neutral start switch 45. The temperature of the oil in the hydraulic control unit 40 is detected by the oil temperature sensor 46. The RPM of the output shaft 14 (hereinafter "clutch input side RPM") $N_{CI}$, located at the input side of the first clutch C1, is detected by the RPM sensor 47. The clutch input side RPM $N_{CI}$ is detected as the output RPM of the torque converter 12. Depression or release of the foot pedal is detected by the brake switch 48. Engine RPM $N_E$ is detected by the engine RPM sensor 49. Throttle opening θ is detected by the throttle opening sensor 50. The vehicle speed is detected by the vehicle speed sensor 51. Incidentally, the engine RPM $N_E$ is detected as the input RPM of the torque converter 12.

Figure 4:
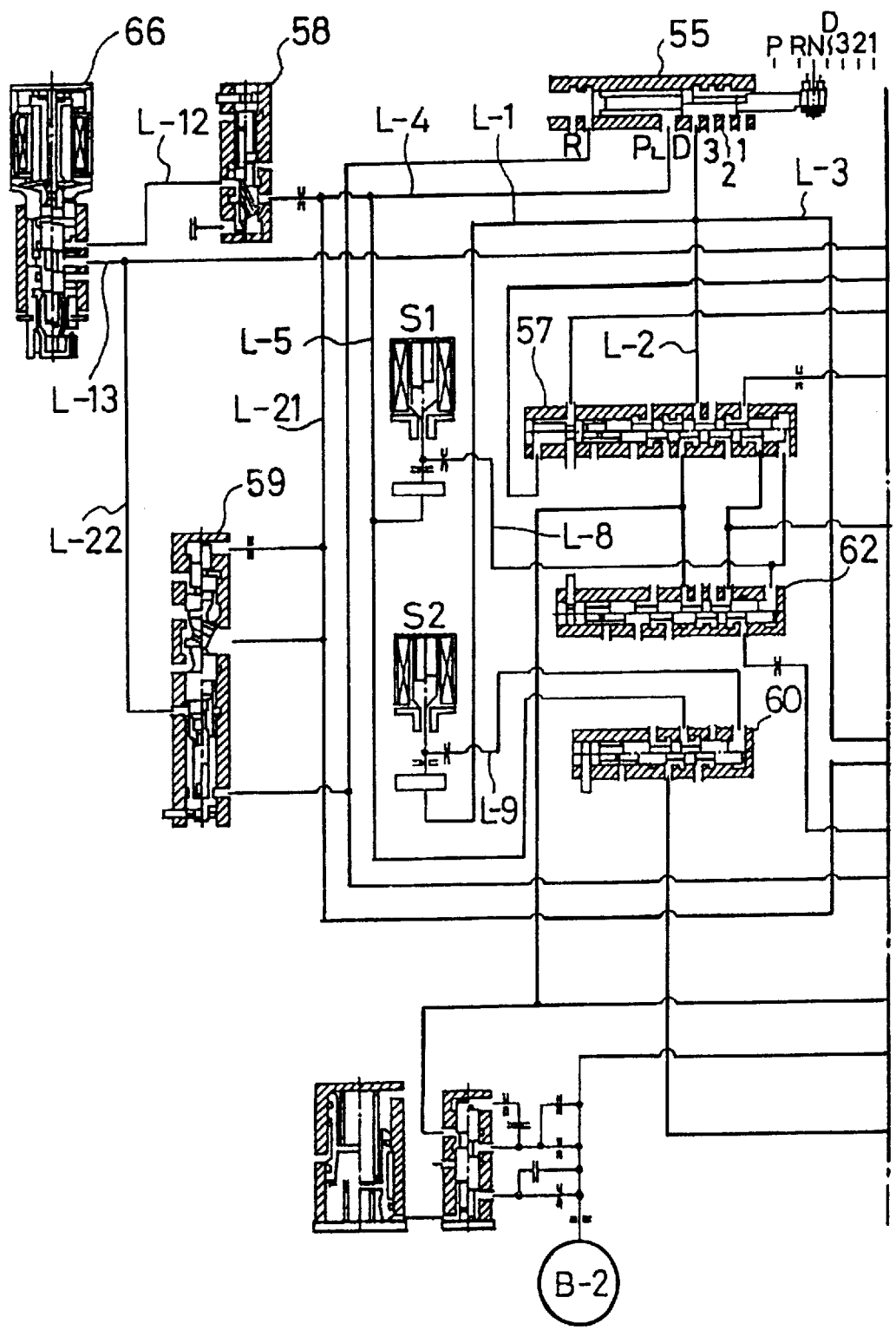
FIG. 4 shows part of an embodiment of a hydraulic circuit diagram for control of the transmission shown in FIG. 2.
Figure 5:
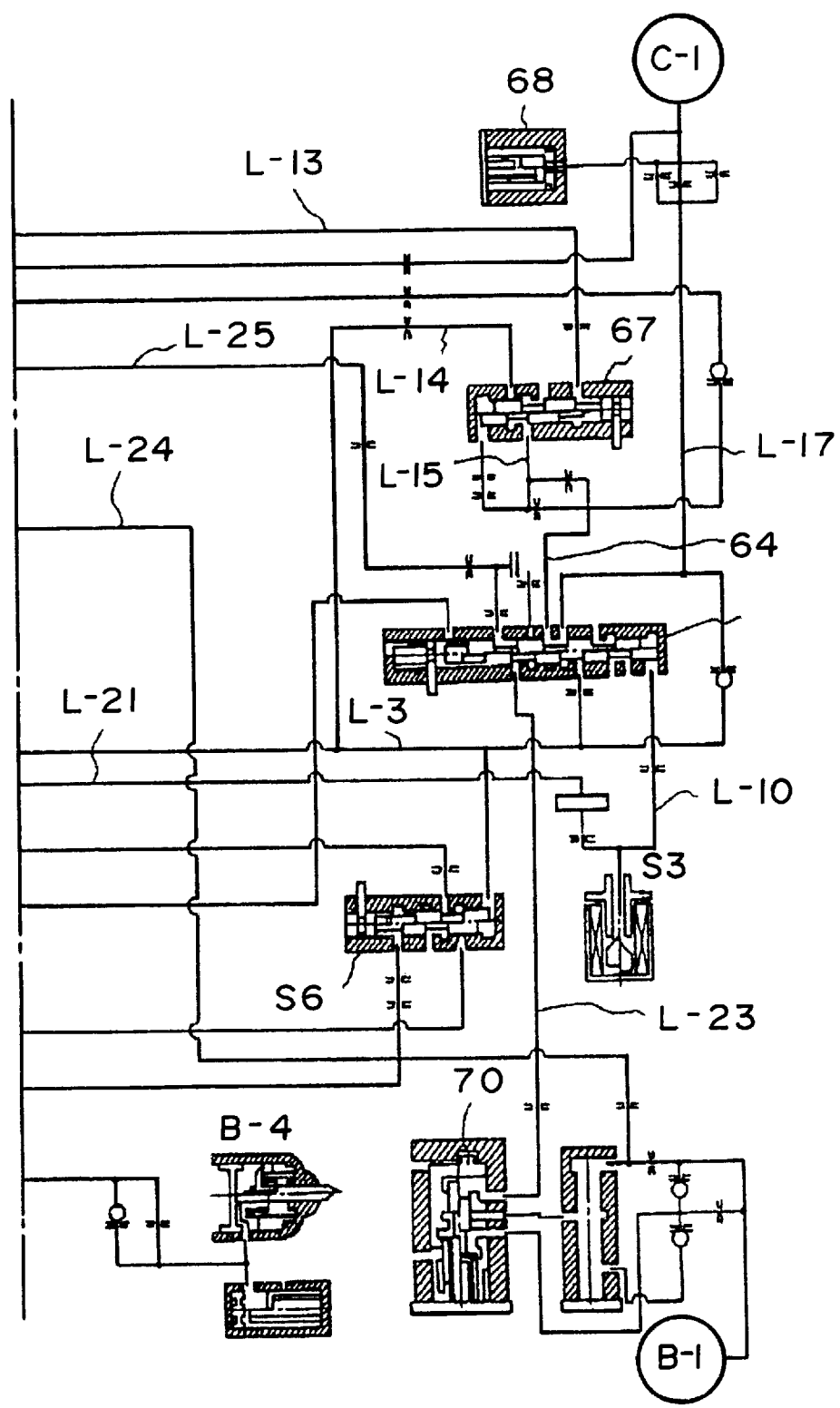
FIG. 5 shows the remainder of the hydraulic circuit of FIG. 4.

As shown in FIGS. 4 and 5, a primary valve 59 regulates the oil pressure coming from the oil pressure source and outputs it as a line pressure to an oil line L-21. A manual valve 55 is provided with ports 1, 2, 3 , D, PL and R so that the line pressure, as fed from the primary valve 59 through oil lines L-21 and L-4 to the port $P_L$, is established as 1-range, 2-range, 3-range, D-range and R-range pressures at the respective ports 1, 2, 3, D and R by manipulation of the shift lever.

When the shift lever is placed in the D-range position, the D-range pressure oil, as established at the port D, is fed through an oil line L-1 to the second solenoid valve S2, through an oil line L-2 to a 1-2 shift valve 57, and through an oil line L-3 to a B-1 sequence valve 56. On the other hand, the line pressure from the primary valve 59 is fed through the oil line L-21 to the third solenoid valve S3.

Moreover, the line pressure from the oil line L-21 is fed through the oil line L-4 to a solenoid modulator valve 58 and through an oil line L-5 to the first solenoid valve S1 and a 2-3 shift valve 60.

The first solenoid signal $S_1$, the second solenoid signal $S_2$ and the third solenoid signal $S_3$ for opening/closing the first solenoid valve S1, the second solenoid valve S2 and the third solenoid valve S3 are turned ON/OFF in response to a change-over signal coming from the automatic transmission control system 41 (FIG. 2). As a result, the first solenoid valve S1 feeds a signal oil pressure through an oil line L-8 to the 1-2 shift valve 57 and a 3-4 shift valve 62. The second solenoid valve S2 feeds a signal oil pressure through an oil line L-9 to the 2-3 shift valve 60. The third solenoid valve S3 feeds a change-over signal oil pressure through an oil line L-10 to a neutral relay valve 64.

The 1-2 shift valve 57 takes the position shown as the upper half in the drawings in 1st speed and the lower half position in 2nd to 4th speeds. The 2-3 shift valve 60 takes the lower half position in the 1st and 2nd speeds and the upper half position in the 3rd and 4th speeds. The 3-4 shift valve 62 takes the upper half position in the 1st and 4th speeds and the lower half position in the 2nd and 3rd speeds. The neutral relay valve 64 takes the upper half position in neutral control and the lower half position in the 1st to 4th speeds.

The solenoid modulator valve 58 is connected through an oil line L-12 to a linear solenoid valve 66, which is connected through an oil line L-13 to a C-1 control valve 67. The linear solenoid valve 66 is further connected through an oil line L-22 to the primary valve 59.

Linear solenoid valve 66 is controlled by a control signal received from the automatic transmission control system 41, and feeds a throttle pressure $P_{TH}$ as the control signal oil pressure through the oil line L-13 to the C-1 control valve 67. The C-1 control valve 67, in turn, receives the D-range pressure through the oil lines L-3 and L-14 and regulates the received D-range pressure to output a control oil pressure (hereinafter "C-1 oil pressure") $P_{CI}$, responsive to the throttle pressure $P_{TH}$ coming from the linear solenoid valve 66, and feeds the C-1 oil pressure $P_{CI}$, to an oil line L-15.

A spring is arranged in the B-1 sequence valve 56 at the left-hand end in the drawing, whereas a control oil chamber is formed at the right-hand end of the valve 56, for applying opposing loads to the spool. The B-1 sequence valve 56 in 1st speed takes the lower half position in response to the D-range pressure it receives in its control oil chamber through the oil line L-3. As the oil pressure fed in 2nd speed to hydraulic servo B-2 is raised, the B-1 sequence valve 56 receives the sequence pressure from the hydraulic servo B-2 and is thereby caused to move to its upper half position, i.e. its spool is moved rightward by the sequence pressure and the spring load.

As a result, the oil pressure from the 1-2 shift valve 57 is fed through the B-1 sequence valve 56 to the 3-4 shift valve 62 and further from the 3-4 shift valve 62 via an oil line L-24 through the B-1 control valve 70 to the hydraulic servo B-1. Thus, the oil pressure is fed to the hydraulic servo B-1 in response to the rise of the oil pressure in the hydraulic servo B-2.

The neutral relay valve 64 takes the upper half position during the neutral control. In neutral control, therefore, the C-1 oil pressure PC1, as established in the oil line L-15, is fed through an oil line L-16, the neutral relay valve 64 and an oil line L-17 to the hydraulic servo C-1. Moreover, the oil pressure, as fed through the B-1 sequence valve 56 to the 3-4 shift valve 62, is also fed to the 1-2 shift valve 57, from which it is further fed as a signal pressure via an oil line L-25, through the neutral relay valve 64 and via an oil line L-23 to the B-1 control valve 70.

In the 1st to 4th speeds the neutral relay valve 64 takes the lower half position. In the 1st to 4th speeds, therefore, the oil at D-range pressure is fed through the oil line L-3, the neutral relay valve 64 and the oil line L-17 to the hydraulic servo C-1. For neutral control, the neutral relay valve 64 is switched to the upper half position to connect the oil line L-16 and the oil line L-17.

A damper valve 68 is arranged in the oil line L-17 for smoothing the release of the oil from the hydraulic servo C-1.

Incidentally, B-4 designates the hydraulic servo which operates the fourth brake B4.

Figure 6:
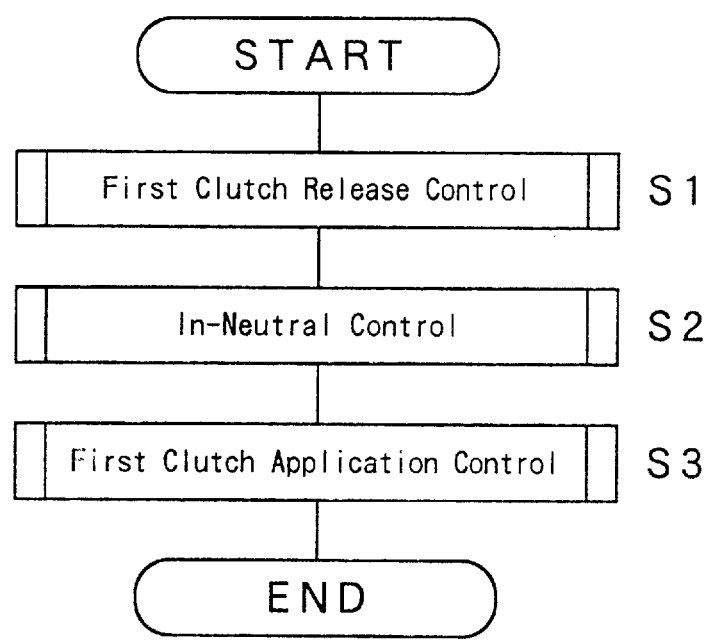
FIG. 6 is a flow chart of a neutral control routine used by the control system of the present invention.
Figure 7:
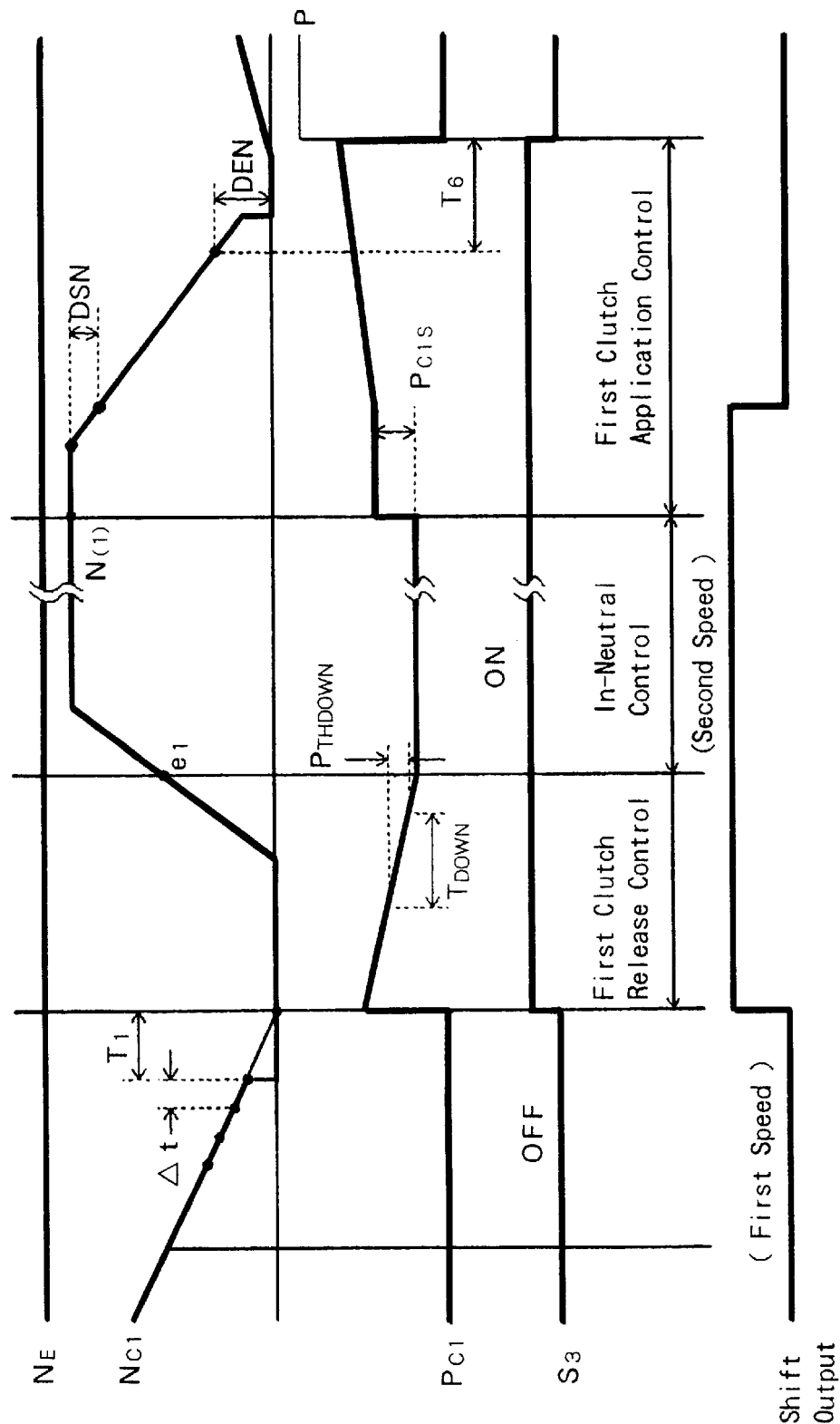
FIG. 7 is a time chart of operations of the automatic transmission control system in the embodiment of the present invention shown in FIG. 2.

With reference now to the neutral control subroutine of FIG. 6, in Step S1 the release means 102 of the automatic transmission control unit 41 (FIG. 1) executes the first clutch release control. In this step, zero vehicle speed estimation is executed to output the 2nd speed shift signal at a set timing so that application of the second brake B2 (FIG. 2) and of the first brake B1 are started to provide hill-hold control with sweep down of the C-1 oil pressure $P_{C1}$ at a set timing.

For this purpose, the engine RPM NE corresponding to the input torque is determined and the C-1 oil pressure $P_{C1}$ is regulated to correspond to the engine RPM $N_E$, and the C-1 oil pressure $P_{C1}$ is gradually lowered.

Incidentally, the input torque can be detected not only from the engine RPM $N_E$ but also indirectly from the engine air suction or the fuel injection rate. Moreover, the input torque of the speed change unit 16 can also be directly detected by the torque sensor (not shown). In this latter case, the torque sensor is attached to the output shaft 14 of the torque converter 12.

In step S2 in-neutral control is executed to establish the neutral control state. In this step, stabilization of the engine RPM $N_E$ and the clutch input side RPM $N_{C1}$ is awaited. After these stabilizations, the C-1 oil pressure $P_{C1}$, is raised or lowered by set pressures according to the two RPMs.

In step S3 the application means 103 of the automatic transmission control unit 41 executes the first clutch application control. In this step, the C-1 oil pressure $P_{C1}$ is incrementally raised by a set pressure which is set on the basis of the throttle opening $\theta$ and the engine RPM $N_E$, to complete the stroke of the piston in the hydraulic servo C-1 (FIG. 5). After the end of the piston stroke of the hydraulic servo C-1, the C-1 oil pressure $P_{C1}$ is raised by set pressures to prevent application shock.

Figure 8:
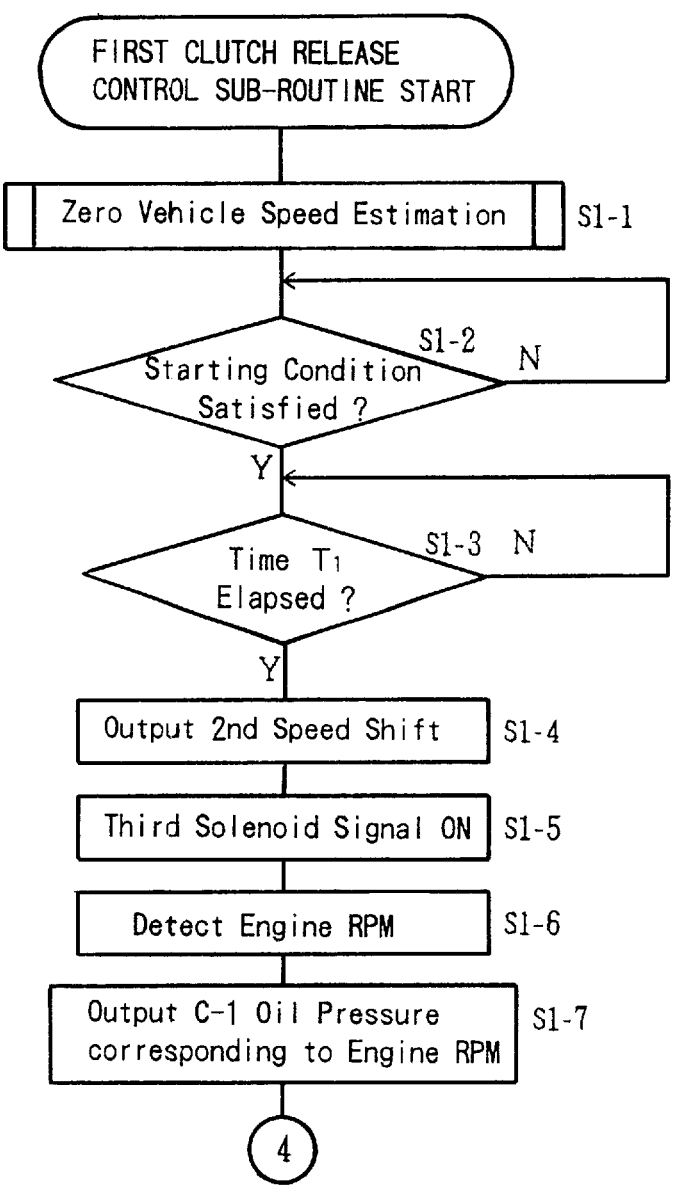
FIG. 8 is a partial flow chart of the first clutch release control subroutine of step S1 in FIG. 6.
Figure 9:
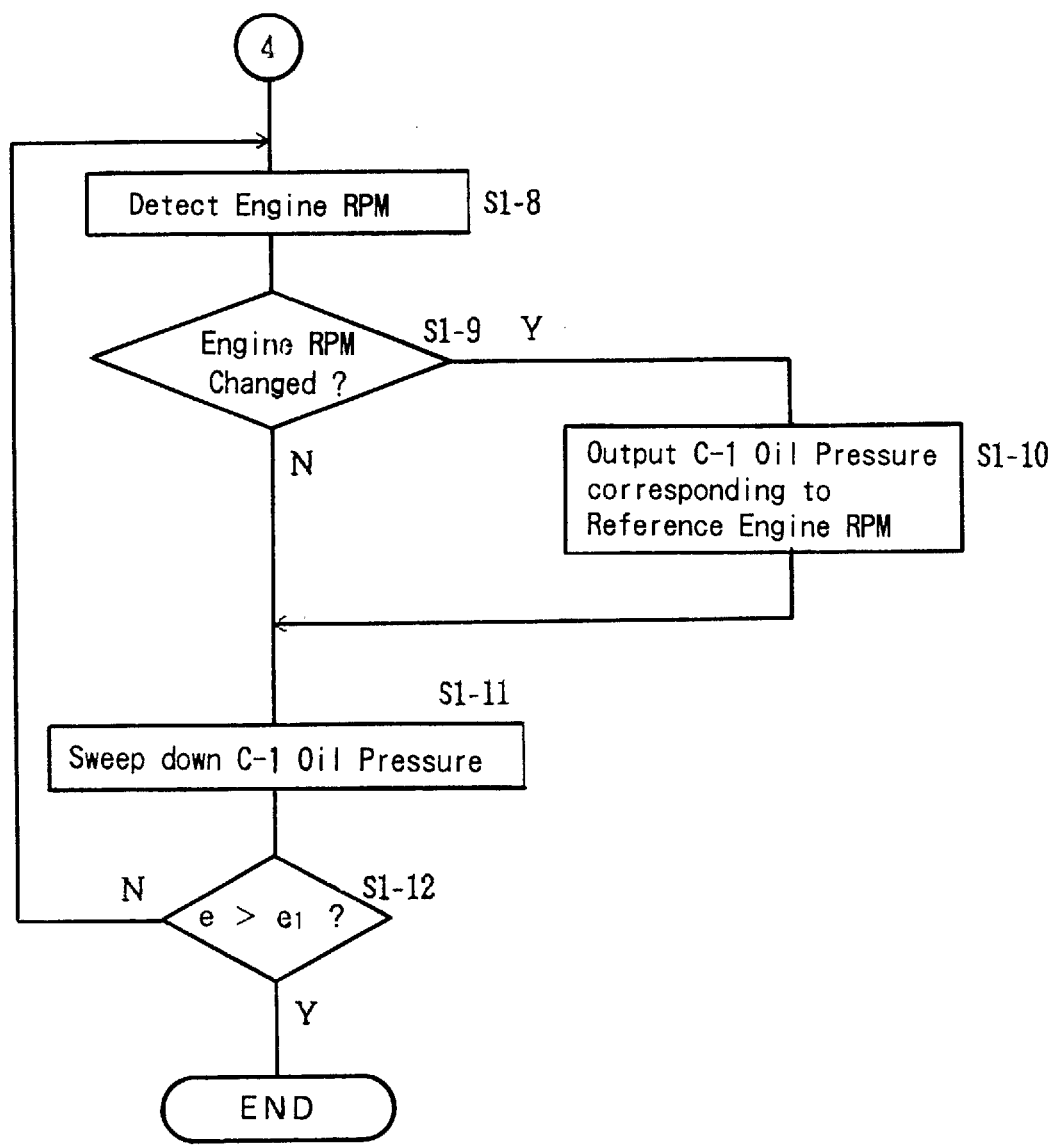
FIG. 9 is the remainder of the flow chart of FIG. 8.

Next, the first clutch release control sub-routine executed in Step S1 in the routine of FIG. 6 will be described with reference to FIGS. 8 to 10.

In step S1-1 the zero vehicle speed is estimated on the basis of the variation of the clutch input side RPM $NC_1$.

In step S1-2 the stop state detecting means 101 (FIG. 1) awaits satisfaction of the starting condition for the neutral control. At the same time, the timing of the first timer (not shown) is started.

In step S1-2 it is decided that the starting condition is satisfied, if all the following individual conditions are satisfied: that the clutch input side RPM $N_{C1}$ is substantially zero; that the accelerator pedal (not shown) is released so that the throttle opening $\theta$ is less than a predetermined value; that the oil temperature detected by the oil temperature sensor 46 (FIG. 2) is higher than a predetermined value; and that the brake pedal (not shown) is depressed so that the brake switch 48 is ON. Incidentally, whether or not the clutch input side RPM $N_{C1}$ is substantially zero is decided depending upon whether or not the detection limit of the RPM sensor 47 is reached. In the present embodiment, it is decided that the detection limit is reached when the actual vehicle speed reaches a predetermined value, e.g. 2 km/h.

In step S1-3 the stop state detecting means 101 awaits lapse of a time period $T_1$, as timed by the first timer, and the sub-routine advances to Step S1-4 when the time period $T_1$ has elapsed. Here, the time period $T_1$ is calculated in the zero vehicle speed estimation step and zero vehicle speed is estimated for the end of the time period $T_1$.

In step S1-4 the 2nd-speed shift signal for starting the hill-hold control is output, and the first solenoid signal $S_1$ for opening/closing the first solenoid valve S1 (FIG. 4) is turned ON to feed the oil pressure to the hydraulic servo B-2 to thereby apply the second brake B2. As the oil pressure in the hydraulic servo B-2 rises, the sequence pressure in the hydraulic servo B-2 is fed to the B-1 sequence valve 56 (FIG. 5), causing oil pressure to be fed to the hydraulic servo B-1 thereby applying the first brake B1.

Thus, the hill-hold control is executed to establish the 2nd-speed gear stage in the speed change unit 16 so that the first clutch C1, the first brake B1, the second brake B2 and the fourth brake B4 are applied to lock the one-way clutches F1 and F3. If the vehicle were to move backward while facing uphill in this state, a reverse rotation would be transmitted to the output shaft 23 of the auxiliary transmission 19 to rotate the ring gear R1 forward. However, this forward rotation is blocked by the one-way clutch F2 so that the vehicle cannot move backward.

In step S1-5 the third solenoid signal $S_3$ is turned ON to switch the neutral relay valve 64 to the upper half position to thereby provide for control of the C-1 oil pressure $P_{C1}$.

Figure 10:
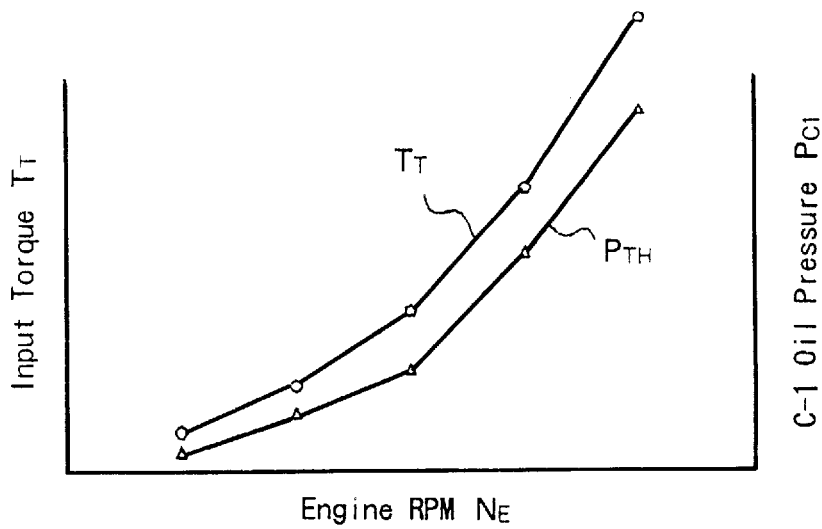
FIG. 10 is a graph wherein the abscissa indicates the engine RPM $N_E$, and the ordinate indicates the intake torque $T_T$ (=t·C·$N_E^2$) and the C-1 oil pressure $P_{Cl}$.

In step S1-6, as shown in FIG. 10, the engine RPM $N_E$ corresponding to the input torque $T_T$ is detected to set the value of the engine RPM $N_E$ to a reference engine RPM $N_E$m.

In step S1-7, the C-1 oil pressure $P_{C1}$, immediately before the first clutch C1 is released according to the engine RPM $N_E$, is established and output.

In step S1-8, the engine RPM $N_E$ corresponding to the input torque $T_T$ is again detected.

In step S1-9, the engine RPM $N_E$ is compared with the reference engine RPM $N_E$m to decide whether or not it has changed. The sub-routine advances to Step S1-10, if the engine RPM $N_E$ changed in comparison with the reference engine RPM $N_E$m, but to Step S1-11 if NOT.

In step S1-10 when it is decided at Step S1-9 that the engine RPM $N_E$ has changed from the reference engine RPM $N_{Em}$, the value of the engine RPM $N_E$ is set as the reference engine RPM $N_{Em}$, and the C-1 oil pressure $P_{C1}$ corresponding to the new reference engine RPM $N_{Em}$ is established and output.

In step S1-11 the C-1 oil pressure $P_{C1}$ is lowered (or swept down) by set pressures $P_{THDOWN}$ for every lapse of a set time period $T_{DOWN}$, as expressed by the following formula:

$P_{TH}=P_{TH}-P_{THDOWN}$.

In step S1-12, after the release of the first clutch C1, the pressure reduction of Step S1-11 is continued until a speed ratio e (=$N_{C1}/N_E$) exceeds a constant $e_1$. When the speed ratio e exceeds the constant $e_1$, the pressure reduction of Step S1-11 is stopped to end the routine. If the speed ratio e fails to exceed the constant $e_1$, the sub-routine returns to Step S1-8. The constant $e_1$ is set to 0.75, for example, based on the delay of the change in the clutch input side RPM $NC_1$ on the basis of which oil pressure for releasing the first clutch C1 is controlled. Incidentally, the speed ratio e may be substituted by the clutch input side RPM $N_{C1}$.

Incidentally, the applied state of the first clutch C1 is detected by deciding whether or not the difference (hereinafter "rotational difference") ΔN between the engine RPM $N_E$, or the input side RPM of the torque converter 12, and the clutch input side RPM $N_{CI}$, or the output side RPM, has changed. The rotational difference ΔN does not change regardless of whether the first clutch C1 is completely applied or released. This makes it difficult to determine the status of clutch C1, i.e. applied or released.

By awaiting the speed ratio to exceed the constant $e_1$, therefore, it is possible to reliably establish the state immediately before the application of the first clutch C1 is started. Incidentally, the rotational difference ΔN is calculated by the calculation means 102 in the automatic transmission control system 41.

Figure 11:
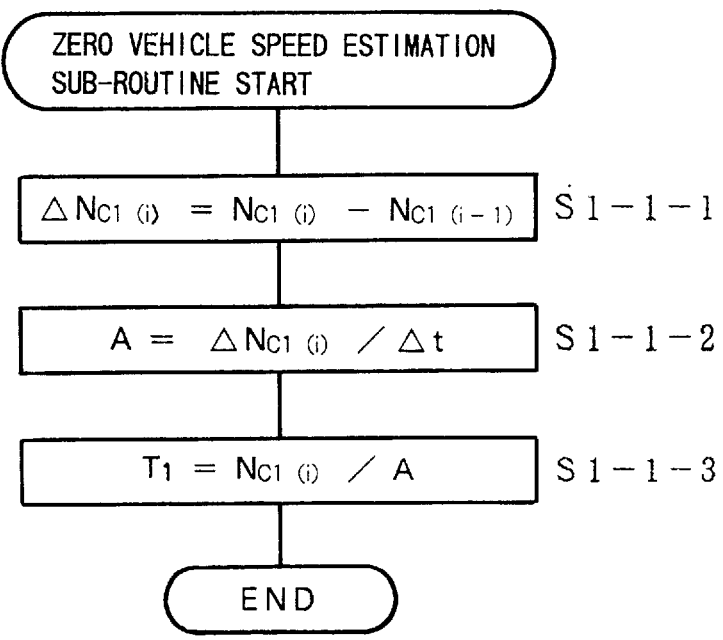
FIG. 11 is a flow chart of a zero vehicle speed estimating subroutine executed as step S1-1 in the flow chart of FIG. 8.

The sub-routine for zero vehicle speed estimation in Step S1-11 of FIG. 8 will now be described with reference to FIG. 11.

Step S1-1-1: RPM difference $\Delta N_{CI(i)}$ is calculated by subtracting clutch input side RPM $N_{CI(i-1)}$ at a time Δt ago from the present clutch input side RPM $N_{CI(i)}$. In this case, the time period Δt is set with the clock in the automatic transmission control system 41 (FIG. 2) so that the clutch input side RPM $N_{CI}$ is detected for every time period Δt.

Step S1-1-2: Deceleration A of the vehicle is calculated by dividing the RPM difference $\Delta N_{CI(i)}$ by the time period Δt.

Step S1-1-3: The time period $T_1$ until the vehicle reaches a stop state is calculated by dividing the present clutch input side RPM $N_{CI(i)}$ by the deceleration A.

Next, the relationships between the applied/released states of the first clutch C1 and the rotational difference ΔN will be described with reference to FIGS. 12 to 14.

Figure 12:
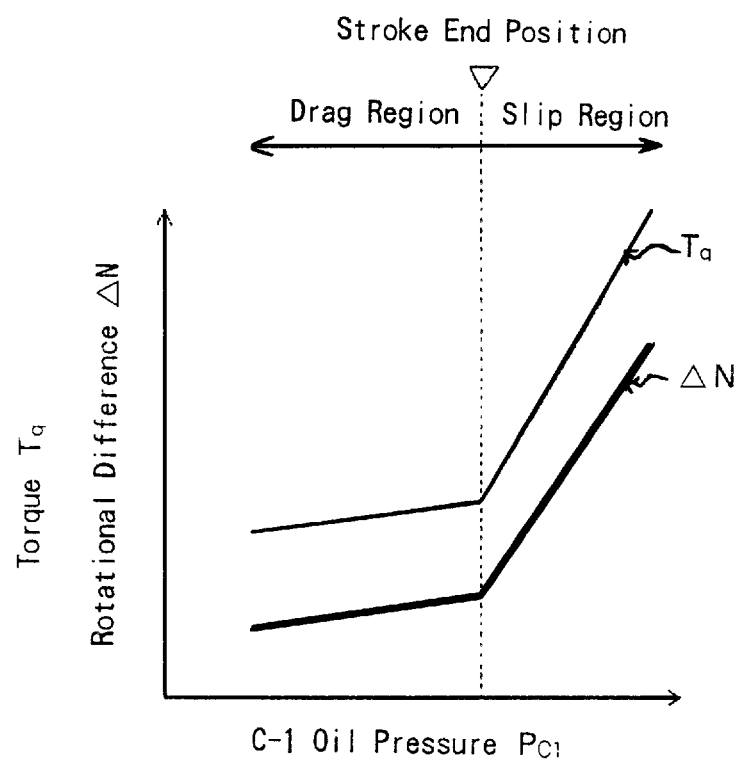
FIG. 12 is a graph of torque Tq and rotational difference $\Delta N$ versus C-1 oil pressure $P_{Cl}$ and serves to illustrate operation of the first clutch in the present invention.

In FIG. 12, $T_q$ designates the torque transmitted from the engine 10 (FIG. 2) to the speed change unit 16 through the first clutch C1, and ΔN designates the rotational difference.

As the C-1 oil pressure $P_{CI}$ is gradually raised, as illustrated in FIG. 12, the torque $T_q$ increases so that the torque converter 12 is accordingly loaded to increase the rotational difference ΔN.

By determining the rotational difference ΔN, therefore, it is possible to distinguish between the applied/released states of the first clutch C1 (FIG. 2), i.e., the torque transmission state.

When the application of the first clutch C1 is started from its completely released state to raise the C-1 oil pressure $P_{CI}$, the piston of the hydraulic servo C-1 reaches the position (hereinafter "stroke end position") at which its stroke is completed. When the C-1 oil pressure $P_{CI}$ is further raised, the first clutch C1 comes into the completely applied state. Hence, the region between the completely released state of the first clutch C1 and the arrival of the piston at the stroke end position is designated the drag region (or inoperative region) whereas the region between the arrival of the piston at the stroke end position and the completely applied state of the first clutch C1 is designated the slip region (or operative position).

In the drag region, the individual friction elements of the first clutch C1 are not in contact with each other. However, a small torque $T_q$ is transmitted through the first clutch C1 due to the viscosity characteristics of the oil present between the individual friction elements. Moreover, the torque $T_q$ gradually increases, as the stroke of the piston increases and the clearances (or gaps) between the friction elements decrease. In the drag region, also, the rotational difference ΔN rises according to the transmission of the torque $T_q$ and gradually increases as the torque $T_q$ increases.

In the slip region, on the other hand, the individual friction elements are in contact with each other so that a frictional force abruptly increases the torque. Moreover, the piston has already reached the stroke end position so that the oil in the hydraulic servo C-1 stops its flow but raises the C-1 oil pressure abruptly. As a result, the frictional force is accordingly increased to further increase the torque $T_q$. As a result of the abrupt increase in the torque $T_q$, moreover, the rotational difference ΔN abruptly increases.

The relationship between the amount (hereinafter "variation") δ of the rotational difference ΔN according to the change in the applied/released states of the first clutch C1 and the amount (hereinafter "rate of change") ρ of the rotational difference ΔN for the unit time period can be explained as follows. If the rotational difference ΔN at the start of a sampling time $T_{SAM}$ assumed to be a reference rotational difference $\Delta N_m$, the variation δ can be expressed by the difference between the rotational difference ΔN and the reference rotational difference ΔN at an arbitrary time. If the C-1 oil pressure $P_{CI}$ fed to the hydraulic servo C-1 is to be raised, the rotational difference ΔN changes gradually in the drag region but abruptly in the slip region, as described above. As a result, the variation δ in the rotational difference ΔN is small in the drag region but large in the slip region. Moreover, the rate of change ρ of the rotational difference ΔN is also low in the drag region but high in the slip region. Noting that the rate of change ρ is different in the drag region than in the slip region, standard rates of change $\rho_1$ and $\rho_2$ in the drag region and in the slip region, when the C-1 oil pressure $P_{CI}$ is raised, are determined to suitably select an intermediate value between the two rates of change $\rho_1$ and $\rho_2$, and this intermediate value is set as a reference rate of change $\rho_{REF}$. If this reference rate of change $\rho_{REF}$ is thus set, the rate of change ρ while the first clutch C1 is in the drag region is always smaller than the reference rate of change $\rho_{REF}$, whereas the rate of change while the first clutch C1 is in the slip region is always larger than the reference rate of change $\rho_{REF}$. By comparing the rate of change ρ with the reference rate of change $\rho_{REF}$, therefore, it can be easily decided whether the first clutch C1 is in the drag region or in the slip region. Specifically, it can be decided, if the rate of change ρ is lower than the reference value $\rho_{REF}$, that the first clutch C1 is in the drag region and, if the rate of change $\rho_{REF}$ is higher than the reference value $\rho_{REF}$, that the first clutch C1 is in the slip region. On the basis of this decision, moreover, it is possible to hold the state immediately before the first clutch C1 makes the transition from the drag region to the slip region.

When the in-neutral control is started, the automatic transmission control unit 41 lowers the C-1 oil pressure $P_{CI}$ until at least when the piston of the hydraulic servo C-1 starts its retraction, so that the first clutch C1 is transferred from the slip region to the drag region.

Subsequently, the C-1 oil pressure $P_{CI}$ is so controlled that the rate of change ρ of the rotational difference ΔN does not exceed the reference rate of change $\rho_{REF}$. Here, in the present embodiment, when the rate of change ρ and the reference rate of change $\rho_{REF}$ are compared, the comparison is not direct but, rather, between the variation δ of the rotational difference ΔN for a set time period and the threshold value corresponding to the reference rate of change $\rho_{REF}$.

Figure 13:
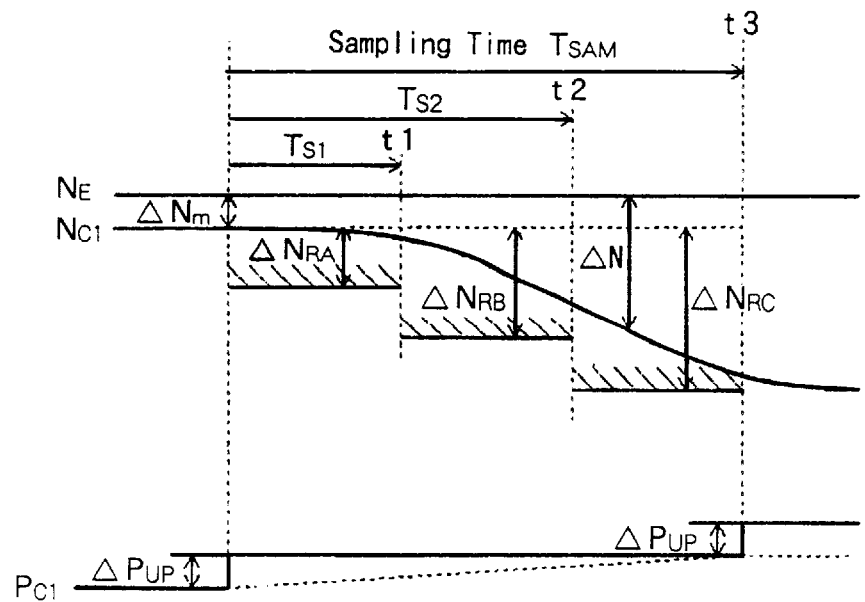
FIG. 13 is a time chart of operation of the first clutch in the drag region.
Figure 14:
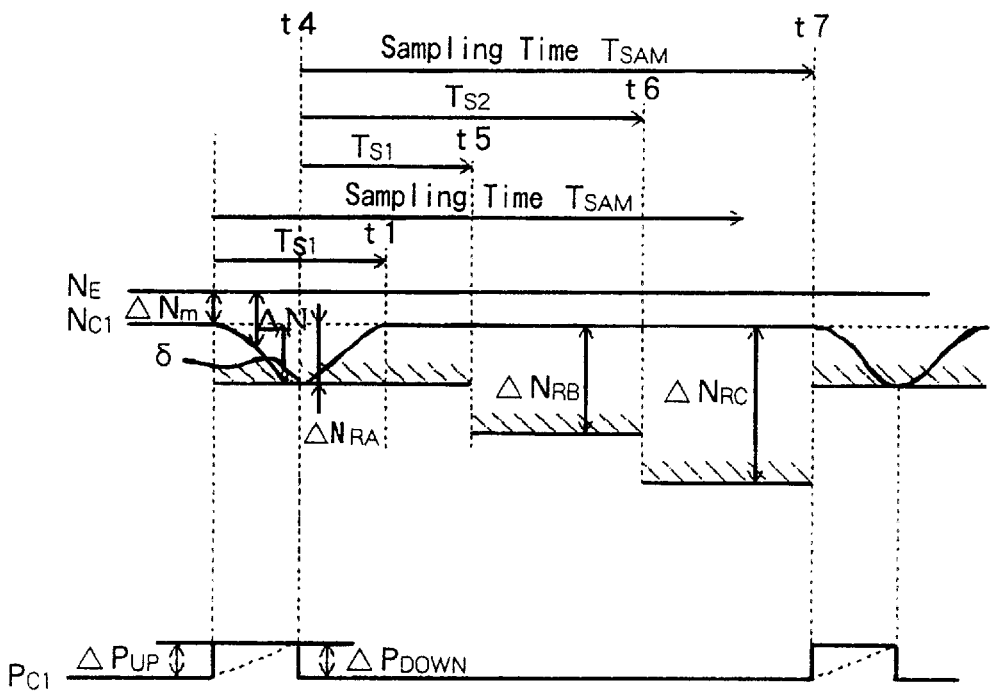
FIG. 14 is a time chart of operation of the first clutch in the slip region.

As shown in FIGS. 13 and 14, moreover, the aforementioned set time periods include, not only the sampling time $T_{SAM}$, but also the time periods $T_{S1}$ and $T_{S2}$ which are obtained by dividing the sampling time $T_{SAM}$ into three. If the times at which the time periods $T_{S1}$ and $T_{S2}$ and the sampling time $T_{SAM}$ elapse after the start of application of the first clutch C1 are designated as t1, t2 and t3, respectively, the individual threshold values $\Delta N_{Ri}$ (i=A, B and C) of the times t1 to t3 are expressed, as follows:

$$\Delta_{RA} = \rho_{REF} \cdot T_{S1};$$

$$\Delta_{RB} = \rho_{REF} \cdot T_{S2};$$

and $$\Delta_{RC} = \rho_{REF} \cdot T_{SM};$$

Since the rate of change ρ is low in the drag region, the threshold value $\Delta N_{Ri}$ is not exceeded at the individual times t1 to t3, as seen in FIG. 13, even if the variation δ of the rotational difference ΔN increases as the time elapses. Therefore, the automatic transmission control unit 41 raises the C-1 oil pressure $P_{Cl}$ by set pressures $\Delta P_{UP}$, as the sampling time $T_{SAM}$ elapses, to transfer the applied/released states of the first clutch C1 to the slip region side. Thus, the piston of the hydraulic servo C-1 is brought closer to the stroke end position each time the sampling time $T_{SAM}$ elapses.

When the piston reaches the stroke end position so that the first clutch C1 transfers to the slip region, the rate of change ρ of the rotational difference ΔN exceeds the reference rate of change $\rho_{REF}$.

As shown in FIG. 14, for example, after the start of the application of the first clutch C1, the variation δ of the rotational difference ΔN exceeds a threshold value $N_{RA}$ at a time t4, prior to lapse of the time period $T_{S1}$. Therefore, the automatic transmission control unit 41 decides that the first clutch C1 has transferred from the drag region to the slip region at time t4 (i.e., at the instant when it is decided by the control program of the automatic transmission control system 41 that the variation δ has exceeded the threshold value $N_{RA}$), and lowers the C-1 oil pressure $P_{Cl}$ by set pressures $\Delta P_{DOWN}$. At this time t4, the sampling time $T_{SAM}$ is reset. If, in this case, the ends of the time periods $T_{S1}$ and $T_{S2}$ and the sampling time $T_{SAM}$, following time t4 are respectively designated as t5, t6 and t7, the threshold value $\Delta N_{Ri}$ is set at each of the times t5 to t7.

Thus, the C-1 oil pressure $P_{Cl}$ is lowered when the first clutch C1 transfers from the drag region to the slip region, and the first clutch C1 is continuously held in the state immediately preceding transfer from the drag region to the slip region.

Since the individual friction elements of the first clutch C1 hardly contact each other, the torque $T_q$ transmitted from the engine 10 to the speed change unit 16 is extremely reduced. This makes it possible not only to improve the fuel economy but also to prevent any idle vibration in the vehicle. It is further possible to prevent the individual friction elements of the first clutch C1 from being heated to reduce their useful service life.

Moreover, the piston of the hydraulic servo C-1 is held immediately ahead of the stroke end position. Hence, the lost stroke of the piston can be reduced to prevent any delay in application, as might otherwise be caused by the lost stroke. As a result, it is possible to prevent racing and application shock of the engine 10.

In the aforementioned drag region, the variation δ of the rotational difference ΔN does not exceed the threshold value $\Delta N_{Ri}$ so that the automatic transmission control unit 41 raises the C-1 oil pressure $P_{Cl}$ by the set pressure $\Delta P_{UP}$ upon each lapse of the sampling time $T_{SAM}$, to transfer the applied/released states of the first clutch C1 to the side of the slip region. However, the rise of the actual C-1 oil pressure $P_{Cl}$ in the hydraulic servo C-1 is delayed by the viscous resistance or the like of the oil when the C-1 oil pressure $P_{Cl}$ is raised by the set pressure $\Delta P_{UP}$.

In the previous decision, it may erroneously appear that the variation δ does not exceed the threshold value $\Delta N_{Ri}$ if a delay is left in the rise of the C-1 oil pressure $P_{Cl}$ at the instant of lapse of the sampling time $T_{SAM}$ after the C-1 oil pressure $P_{Cl}$ has been raised by the set pressure $\Delta P_{UP}$. Since, in this case, the C-1 oil pressure $P_{Cl}$ is raised prematurely, i.e. earlier than necessary, by the set pressure $\Delta P_{UP}$, the delays in the rise of the C-1 oil pressure $P_{Cl}$ are accumulated to cause overshooting in transfer from the drag region to the slip region. Moreover, the piston is retracted more than necessary if the sampling time $T_{SAM}$ is longer than necessary.

Therefore, sampling time $T_{SAM}$ is set to correspond to the time period necessary for the end of the actual change in the C-1 oil pressure $P_{Cl}$ when the C-1 oil pressure $P_{Cl}$ is raised by the set pressure $\Delta P_{UP}$, that the C-1 oil pressure $P_{Cl}$ may be raised at the proper instants in time.

Thus, the C-1 oil pressure $P_{Cl}$ is raised by the set pressure $\Delta P_{UP}$ after the delay in its rise has ended. As a result, no accumulation of delays results and overshooting at the time the first clutch C1 transfers from the drag region to the slip region is prevented. Moreover, the piston of the hydraulic servo C-1 can be prevented from retracting more than necessary.

Figure 15:
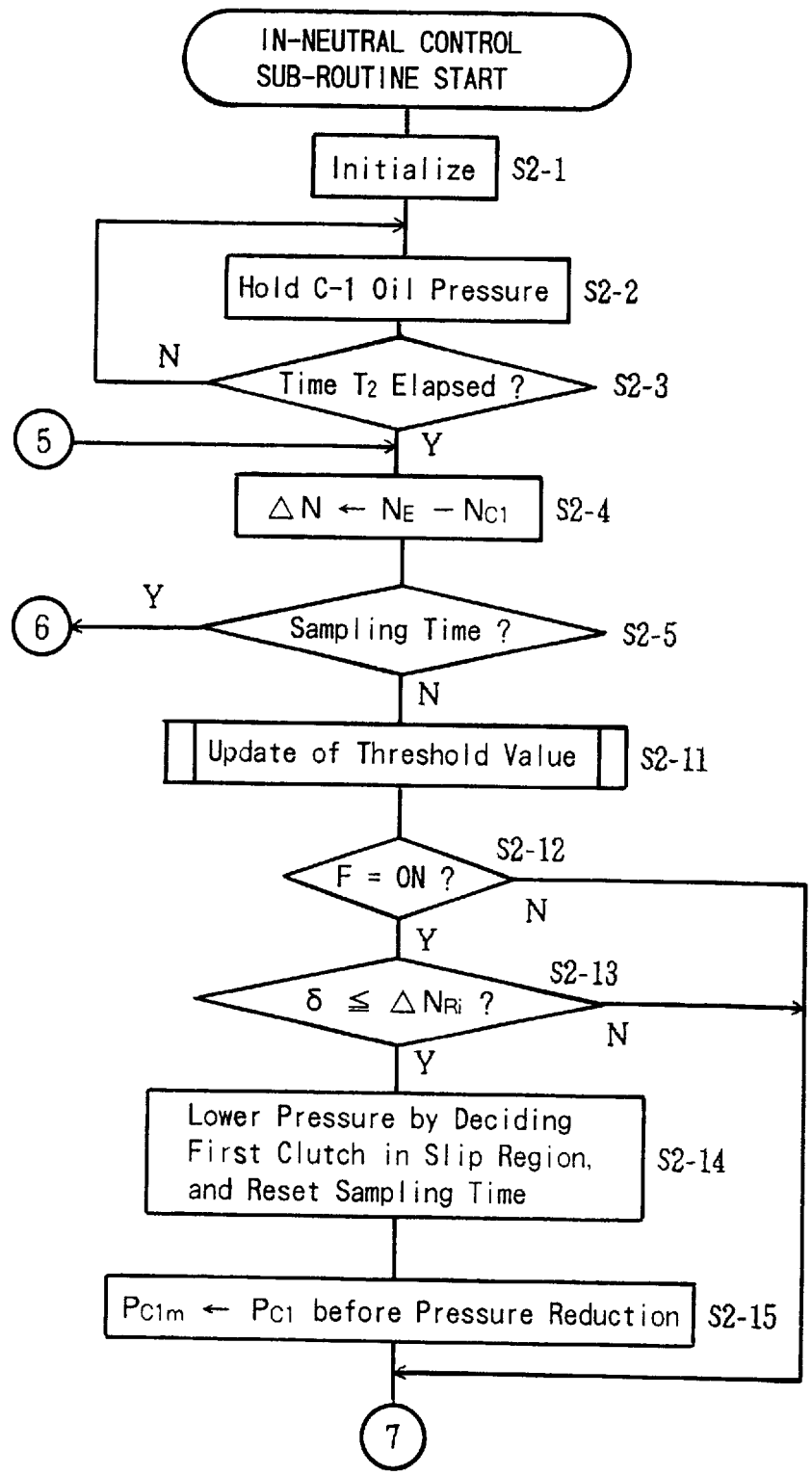
FIG. 15 is a first flow chart of an in-neutral control subroutine executed as step S2 in the main routine of FIG. 6.
Figure 16:
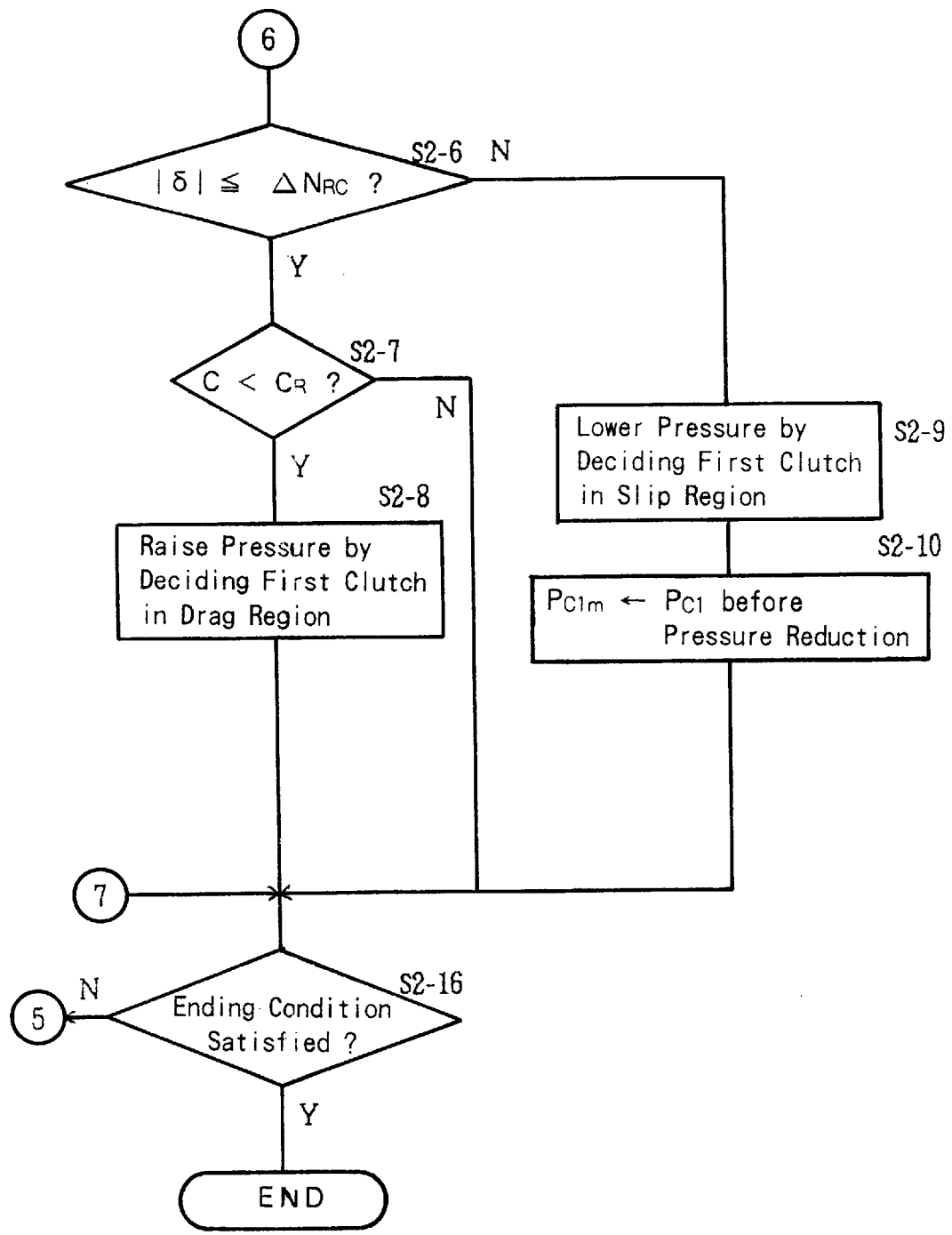
FIG. 16 is a continuation of the flow chart of FIG. 15.

The in-neutral control sub-routine executed in Step S2 of FIG. 6 will now be described with reference to FIGS. 15 and 16.

Step S2-1: The initial values of an oil pressure control flag F, a count value C of the counter (not shown) and the reference rotational difference $\Delta N_m$ are set, as follows:

F←OFF;

C←0;

and $\Delta N_m$←the value of the rotational difference ΔN (=$N_E$-$N_{Cl}$) at this time.

Steps S2-2 and S2-3: The C-1 oil pressure $P_{Cl}$ is held at the final value obtained in the first clutch releasing control subroutine. If the process for decision as to whether or not the rotational difference ΔN has changed is started immediately after it has been confirmed that the first clutch C1 is released to the predetermined state, an erroneous decision may be made due to the change in the rotational difference ΔN caused by the pressure reduction in the first clutch release control routine. Therefore, a second timer (not shown) times lapse of a time period $T_3$, during which the C-1 oil pressure $P_{Cl}$ is held. As a result, the decision as to whether or not the rotational difference ΔN has changed is delayed so that no attempt is made to control the C-1 oil pressure $P_{Cl}$ during the unstable state which immediately follows release of the first clutch C1.

Step S2-4: The rotational difference ΔN between the clutch input side RPM $N_{Cl}$ and the engine RPM $N_E$ is calculated.

Step S2-5: It is decided whether or not the predetermined time $T_{SAM}$, e.g. 1.0 or 0.5 secs, has elapsed. The routine advances to Step S2-6, if the sampling time $T_{SAM}$ has elapsed, but to Step S2-11 if the sampling time $T_{SAM}$ has not elapsed.

Step S2-6: It is decided whether or not the difference between the rotational difference ΔN and the reference rotational difference $\Delta N_m$, i.e., the absolute value of the variation δ, is below a threshold value $\Delta N_{RC}$. The routine advances to Step S2-7, if the absolute value of the variation δ is below the threshold value $\Delta N_{RC}$, but to Step S2-9 if the absolute value of the variation δ is over the threshold value $\Delta N_{RC}$.

Step S2-7: It is decided whether or not the counted value C is below a set value $C_R$. The routine advances to Step S2-8, if the counted value C is below the set value $C_R$, but to Step S2-16 if the counted value C is over the set value $C_R$.

Step S2-8: Since the absolute value of the variation δ is below the threshold value $\Delta N_{RC}$ even after the sampling time $T_{SAM}$ has elapsed, it is decided that the first clutch C1 is in the drag region, and the automatic transmission control unit (FIG. 2) raises (or boosts) the C-1 oil pressure $P_{Cl}$ by the set pressure $\Delta P_{UP}$ at the instant when the sampling time $T_{SAM}$ elapses:

$$P_{Cl} \leftarrow P_{Cl} + \Delta P_{UP}.$$

Moreover, the rotational difference ΔN is set to the reference rotational difference $\Delta N_m$, and the oil pressure control flag F is turned ON:

$$\Delta N_m \leftarrow \Delta N;$$

and $$F \leftarrow ON.$$

Step S2-9: It is decided that the first clutch C1 is transferring from the drag region to the slip region. The C-1 oil pressure $P_{Cl}$ is lowered (or reduced) by the set pressure $\Delta P_{DOWN}$ at the instant when the sampling time $T_{SAM}$ elapses:

$$P_{Cl} \leftarrow P_{Cl} - \Delta P_{DOWN}.$$

Moreover, the rotational difference ΔN is set to the reference rotational difference $\Delta N_m$, and the oil pressure control flag F is turned OFF. At the same time, the value "1" is subtracted from the counted value C of the counter:

$$\Delta N_m \leftarrow \Delta N;$$

$$F \leftarrow OFF;$$

and $$C \leftarrow C-1 (C=0 \text{ for } C<0).$$

If it is decided at Step S1-12 of the first clutch release subroutine that the speed ratio e exceeds the constant $e_1$, it is confirmed that the first clutch C1 is released to some extent. As a result, the first clutch release subroutine is ended, but the first clutch C1 is not released to the point where the piston of the hydraulic servo C-1 will start its retraction. This makes it necessary to lower the C-1 oil pressure $P_{Cl}$ to the extent that the first clutch C1 may transfer from the slip region to the drag region. Thus, the operation of Step S2-9 is repeated until the first clutch C1 transfers from the slip region to the drag region.

Once the first clutch C1 has transferred from the slip region to the drag region, it is held in the state immediately preceding transfer from the drag region to the slip region, so that the operation of Step S2-9 is not executed.

When the variation δ increases over the threshold value $\Delta N_{RC}$, the first clutch C1 can be released so long as the piston of the hydraulic servo C-1 starts its retraction without fail, by repeating the operation of lowering the C-1 oil pressure $P_{Cl}$ by the set pressure $\Delta P_{DOWN}$.

Step S2-10: The C-1 oil pressure $P_{Cl}$ before the pressure reduction at Step S2-9 is set as a reference C-1 oil pressure $P_{Clm}$ and is stored in the memory (not shown):

$$P_{Clm} \leftarrow P_{Cl} \text{ before the pressure reduction.}$$

Step S2-11: The threshold value $\Delta N_{Ri}$ is updated.

Step S2-12: It is decided whether or not the oil pressure control flag F is ON, that is, whether or not the C-1 oil pressure $P_{Cl}$ is raised at the instant of lapse of the previous sampling time $T_{SAM}$. The subroutine advances to Step S2-13, if the oil pressure control flag F is ON, but to Step S2-16 if the oil pressure control flag F is OFF.

Step S2-13: Since the C-1 oil pressure $P_{Cl}$ is raised by the set pressure $\Delta P_{UP}$ (because the oil pressure control flag F is ON) at the instant of lapse of the previous sampling time $T_{SAM}$, it is decided whether or not the variation δ, or the remainder obtained by subtracting the rotational difference ΔN from the reference rotational difference $\Delta N_m$ is below the threshold value $\Delta N_{Ri}$. The routine advances to Step S2-14, if the variation δ is below the threshold value $\Delta N_{Ri}$, but to Step S2-16 if the variation δ is over the threshold value $\Delta N_{Ri}$.

Step S2-14: Because the C-1 oil pressure $P_{Cl}$ is raised by the set pressure $\Delta P_{UP}$ at the instant of lapse of the previous sampling time $T_{SAM}$, the rotational difference ΔN has highly changed. It is, therefore, decided that the first clutch Cl has transferred from the drag region to the slip region, and the C-1 oil pressure $P_{Cl}$ is lowered (or reduced) by the set pressure $\Delta P_{DOWN}$ at the later-described instant of Step S2-16:

$$P_{Cl} \leftarrow P_{Cl} - \Delta P_{DOWN}.$$

Moreover, the sampling time $T_{SAM}$ is reset, and the oil pressure control flag F is turned OFF. At the same time, the value "1" is added to the counted value C of the counter:

$$F \leftarrow OFF;$$

and $$C \leftarrow C+1.$$

If, in this time, the C-1 oil pressure $P_{Cl}$ is lowered by the set pressure $\Delta P_{DOWN}$, the first clutch C1 assumes the state immediately preceding the transfer form the drag region to the slip region. It is, therefore, desirable that the C-1 oil pressure $P_{Cl}$ be raised again by the set pressure $\Delta P_{UP}$ at the instant when the varied C-1 oil pressure $P_{Cl}$ is stabilized by lowering it by the set pressure $\Delta P_{DOWN}$. Therefore, it is determined that the C-1 oil pressure $P_{Cl}$ has been lowered by the set pressure $\Delta P_{DOWN}$. At the instant of this detection, the sampling time $T_{SAM}$ is reset to again start the timing.

Thus, the C-1 oil pressure $P_{Cl}$ is raised early by the set pressure $\Delta P_{UP}$ after it has been lowered by the set pressure $\Delta P_{DOWN}$, so that the first clutch C1 can be always held in the state which immediately precedes transfer from the drag region to the slip region.

Incidentally, if the reduction of the C-1 oil pressure $P_{Cl}$ is detected when the variation δ exceeds the threshold value $\Delta N_{RC}$ after the sampling time $T_{SAM}$ has been reset, the operation of Step S2-9 is executed so that the C-1 oil pressure $P_{Cl}$ is further lowered.

When the C-1 oil pressure $P_{Cl}$ is lowered by the set pressure $\Delta P_{DOWN}$, the reference rotational difference $\Delta N_m$ is not set. Hence, the variation δ is the difference between the rotational difference ΔN and the reference rotational difference $\Delta N_m$ preceded by one, so that it is substantially zero. Hence, the C-1 oil pressure $P_{Cl}$ can be raised by the set pressure $\Delta P_{UP}$ after it has been lowered by the set pressure $\Delta P_{DOWN}$. As a result, the operation of Step S2-9 is hardly ever executed.

Step S2-15: The C-1 oil pressure $P_{Cl}$ before lowered at Step $S_2$-14 is set as the reference C-1 oil pressure $P_{Clm}$ and is stored in memory:

$P_{Clm} \leftarrow P_{Cl}$ before lowered.

Step S2-16: It is decided whether or not the condition for ending the in-neutral control of the first clutch C1 is satisfied. The in-neutral control subroutine is ended, if the ending condition is satisfied, but is returned to Step S2-4 to repeat the aforementioned operation, if the ending condition is not satisfied.

Figure 17:
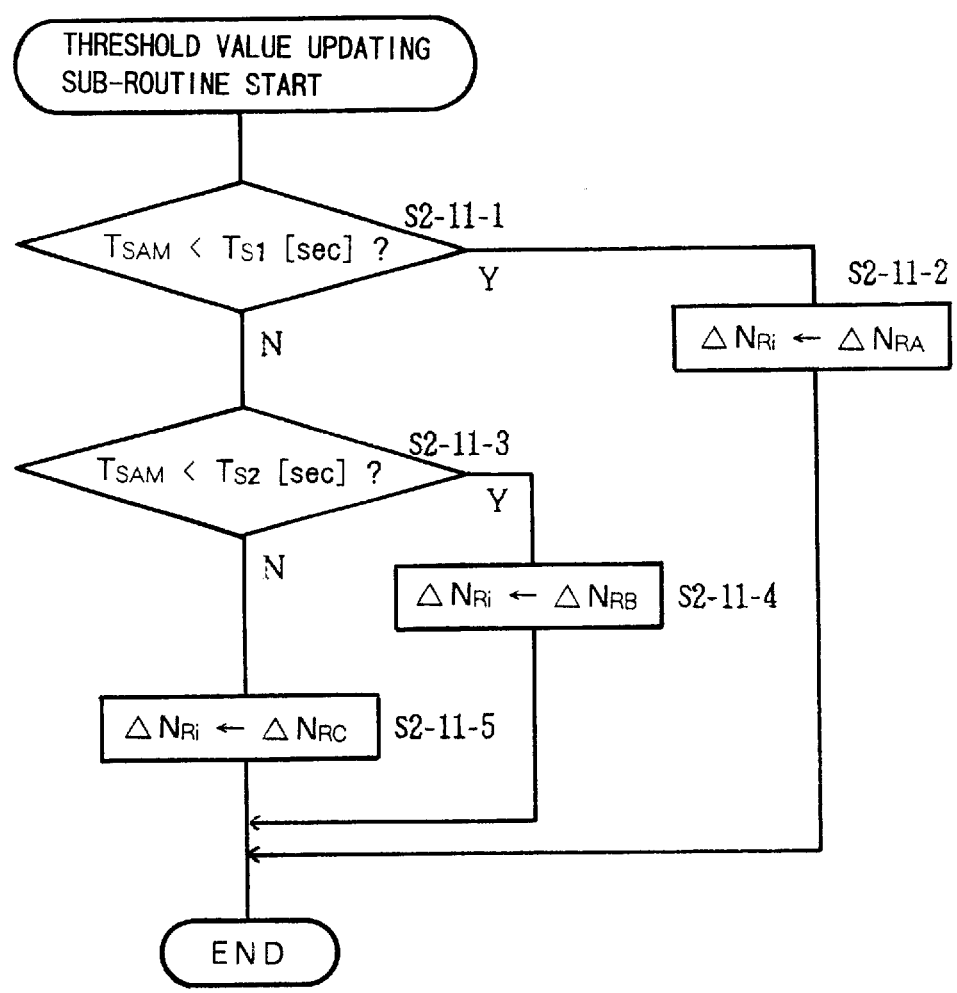
FIG. 17 is a flow chart of a threshold value updating subroutine executed as step S2-11 in the subroutine of FIG. 15.
Figure 18:
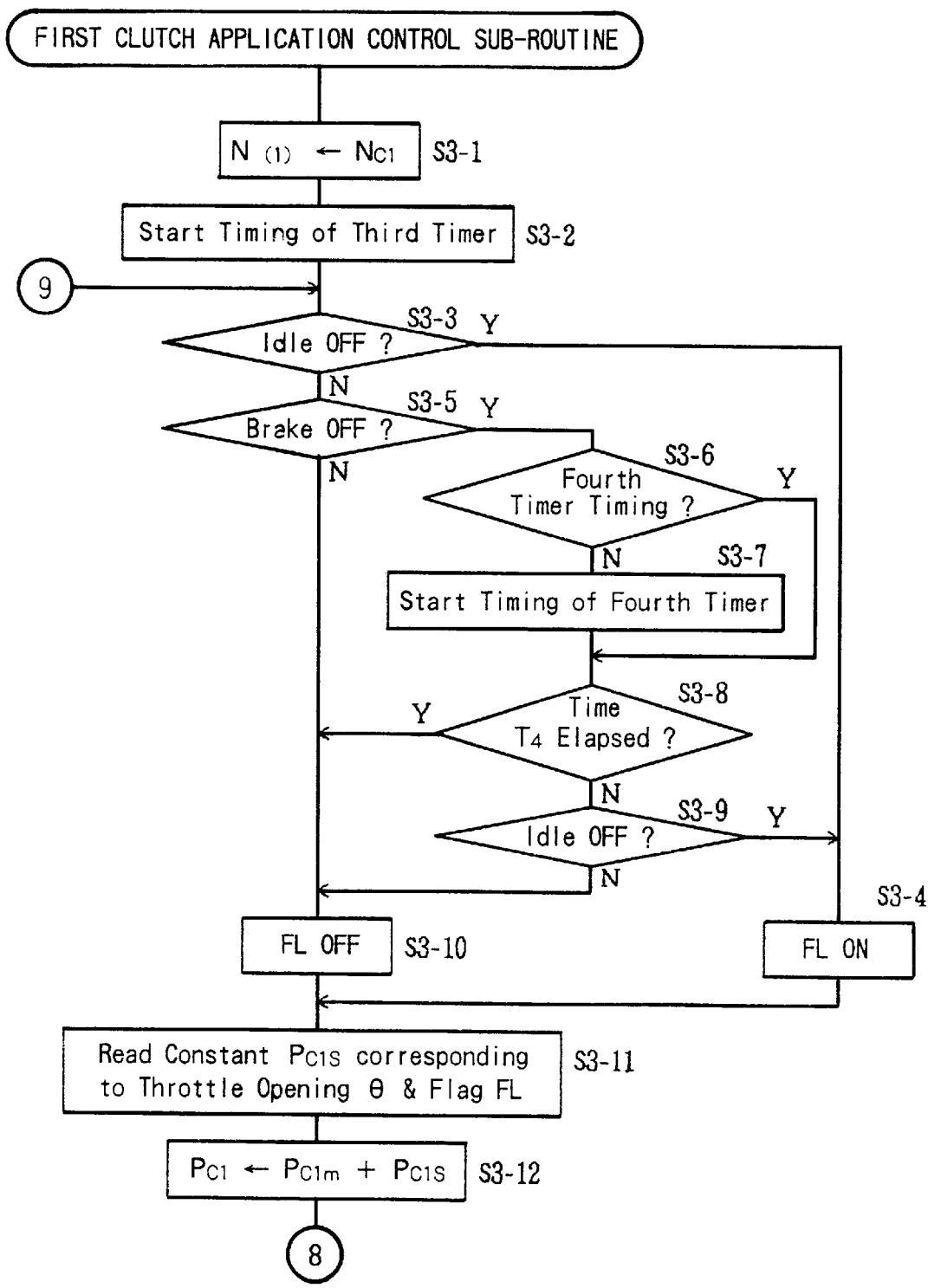
FIG. 18 is a flow chart of a first clutch application control subroutine executed as step S3 in the main routine of FIG. 6.
Figure 19:
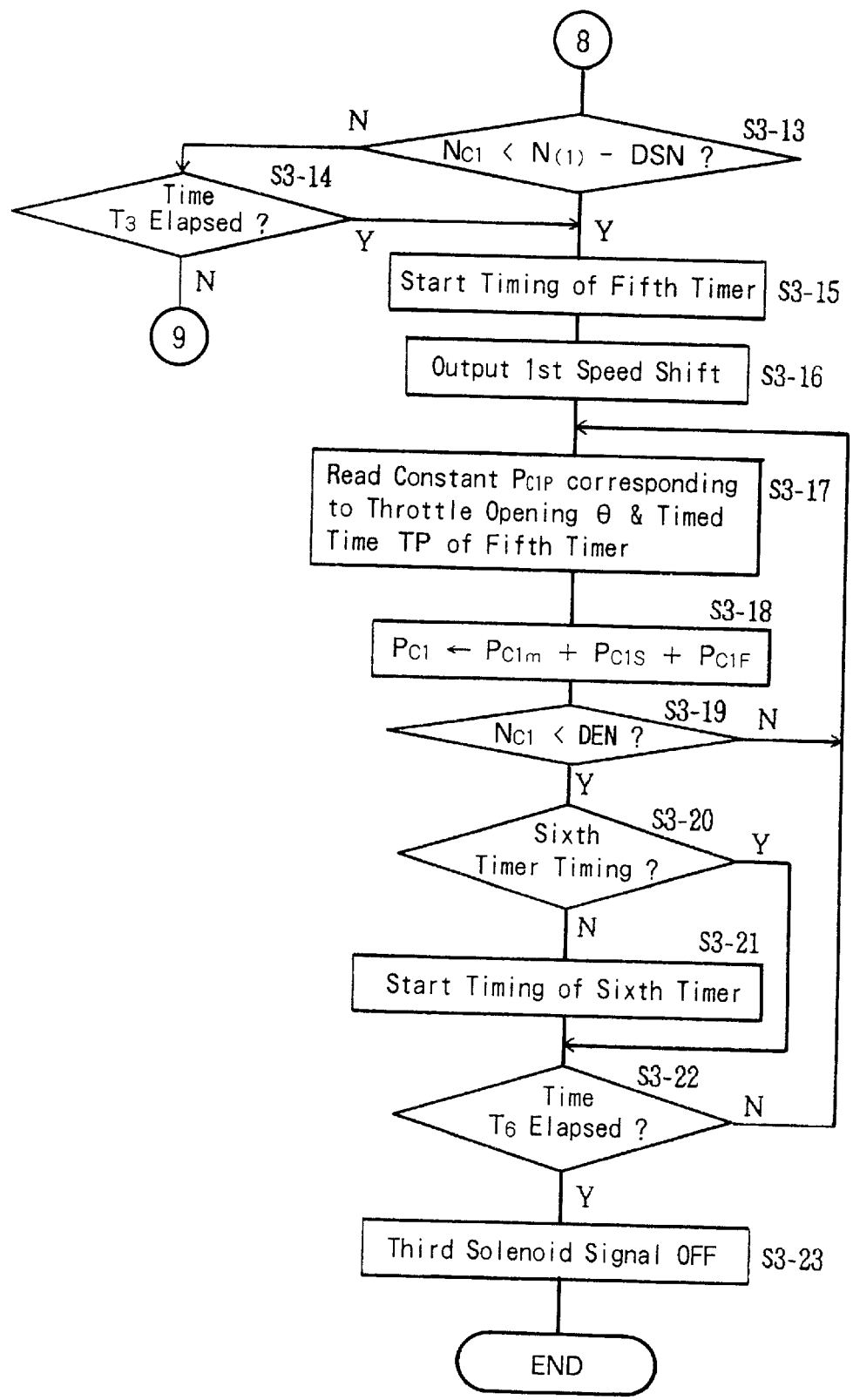
FIG. 19 is a continuation of the flow chart of FIG. 18.
Figure 20:
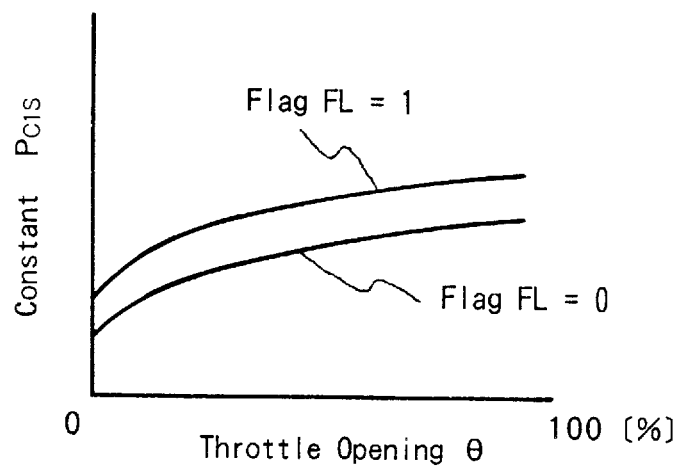
FIG. 20 is a graph (map) of the relationship of constant $P_{Cl}$ (ordinate) versus throttle opening θ (abscissa)
Figure 21:
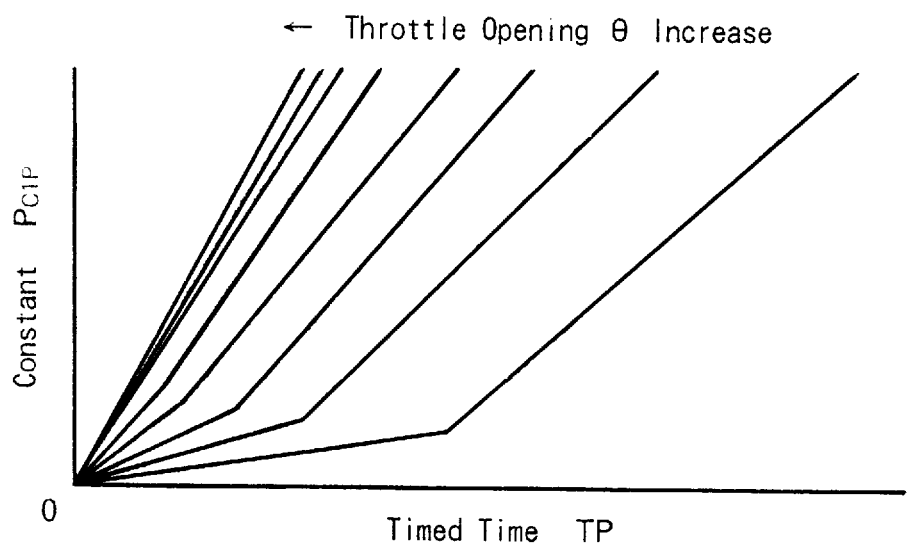
FIG. 21 is a graph (map) of constant $P_{Clp}$ (ordinate) versus timer (measured) time TP (abscissa)

Next, the sub-routine for updating the threshold value $\Delta N_{Ri}$ at Step S2-11 of FIG. 15 will be described with reference to FIG. 17.

In the present embodiment: a threshold value $\Delta N_{RA}$ is set to 15 rpm; a threshold value $\Delta N_{RB}$ is set to 20 rpm; and threshold value $\Delta N_{RC}$ is set to 30 rpm.

Step S2-11-1: It is decided whether or not a time period (hereinafter "elapsed time") $T_{SAM}$, as elapsed from the start of timing of the sampling time $T_{SAM}$, is shorter than the time $T_{S1}$. The routine advances to Step S2-11-2, if the elapsed time $T_{SAM}$ is shorter than the time $T_{S1}$, but to Step S2-11-3 if the elapsed time $T_{SAM}$ is longer than the time $T_{S1}$.

Step S2-11-2: The value $\Delta N_{RA}$ is set as the threshold value $\Delta N_{Ri}$.

Step S2-11-3: It is decided whether or not the elapsed time $T_{SAM}$ is shorter than the time $T_{S2}$. The routine advances to Step S2-11-4, if the elapsed time $T_{SAM}$ is shorter than the time $T_{S2}$, but to Step S2-11-5 if the elapsed time $T_{SAM}$ is longer than the time $T_{S2}$.

Step S2-11-4: The value $\Delta N_{RB}$ is set as the threshold value $\Delta N_{Ri}$.

Step S2-11-5: The value $\Delta N_{RC}$ is set as the threshold value $\Delta N_{Ri}$.

Next, the first clutch application control subroutine executed at Step $S_3$ of FIG. 6 will be described with reference to FIGS. 18 to 24.

Incidentally, if the vehicle is started from idle, the engagement of the first clutch C1 (FIG. 2) is started as the foot brake pedal is released to start the rise in the C-1 oil pressure $P_{C1}$. As a result, a delay in the engagement of the first clutch C1 is without consequence when the accelerator pedal is depressed.

If the vehicle is started from a stalled state, on the other hand, the accelerator pedal is depressed to start the rise in the C-1 oil pressure PC1 and the engagement of the first clutch C1. If the engagement of the first clutch C1 is delayed, the engine RPM $N_E$ has already risen as the accelerator pedal is depressed, when the engagement of the first clutch C1 is started. As a result, application shock is caused by the delay in the engagement of the first clutch C1.

Moreover, if the accelerator pedal is depressed with a slight delay after the brake pedal has been released, the engine RPM $N_E$ may have risen whereas the engagement of the first clutch C1 has not started. In this case, the delay in the engagement occurs as in the stall state to cause application shock.

Figure 22:
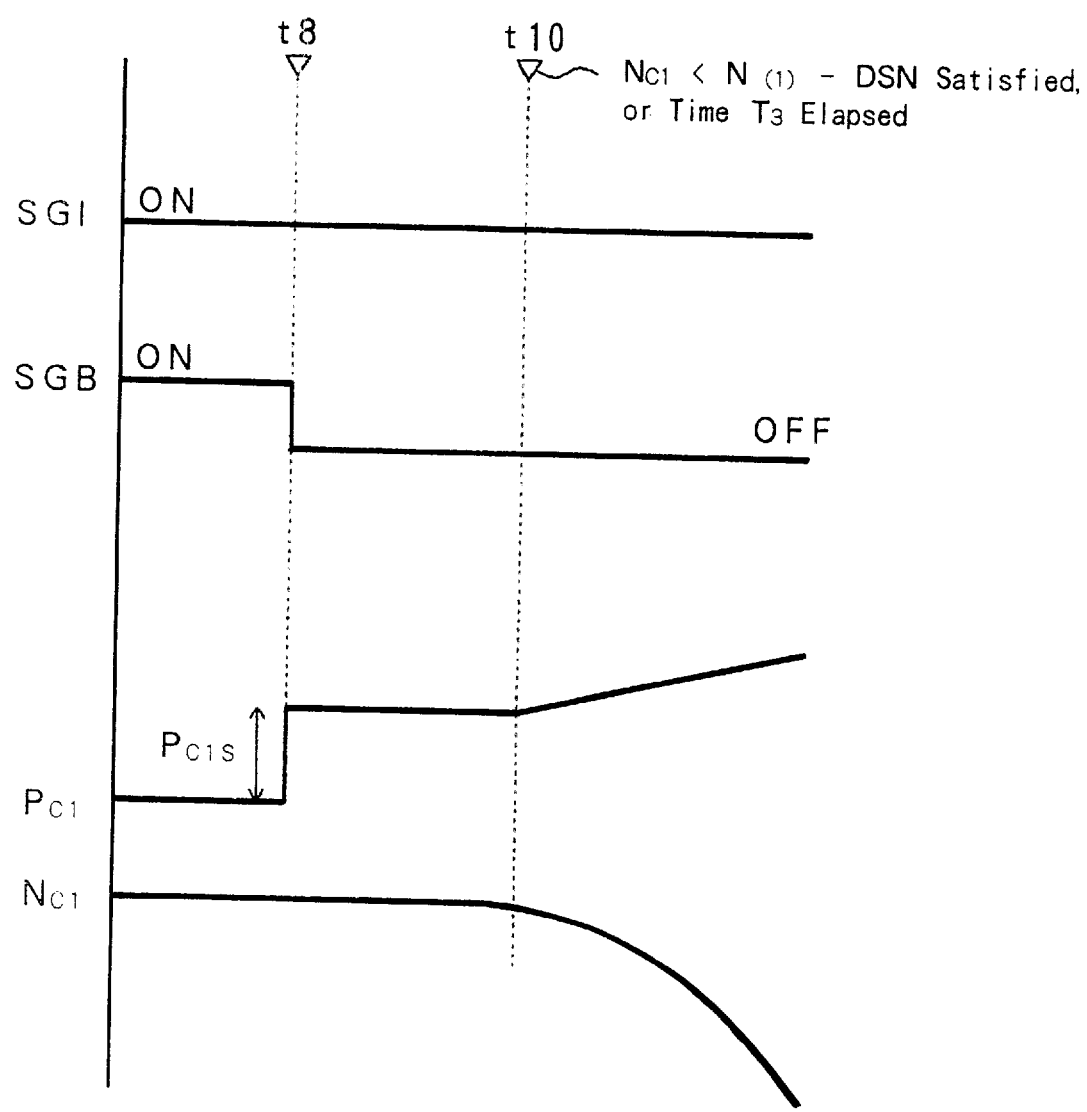
FIG. 22 is a time chart of changes in the C-1 oil pressure in a first control mode.

If, therefore, the vehicle is started from idle, the C-1 oil pressure $P_{Cl}$ is gently raised according to the first mode, as illustrated in FIG. 22.

If the brake pedal is released at a timing t8 to turn OFF a brake signal SGB when the accelerator pedal is released, but the brake pedal is depressed so that both an idle signal SGI and the brake signal SGB are ON, the C-1 oil pressure $P_{Cl}$ is raised by the constant $P_{Cls}$. After this, if either (1) the clutch input side RPM $N_{Cl}$ is smaller at time t10 than the difference, as calculated by subtracting a constant DSN from a value $N_{(1)}$, or (2) a time period $T_3$ has elapsed, the C-1 oil pressure $P_{Cl}$ is further raised by the constant $P_{Clp}$ to effect the sweep-up.

Figure 23:
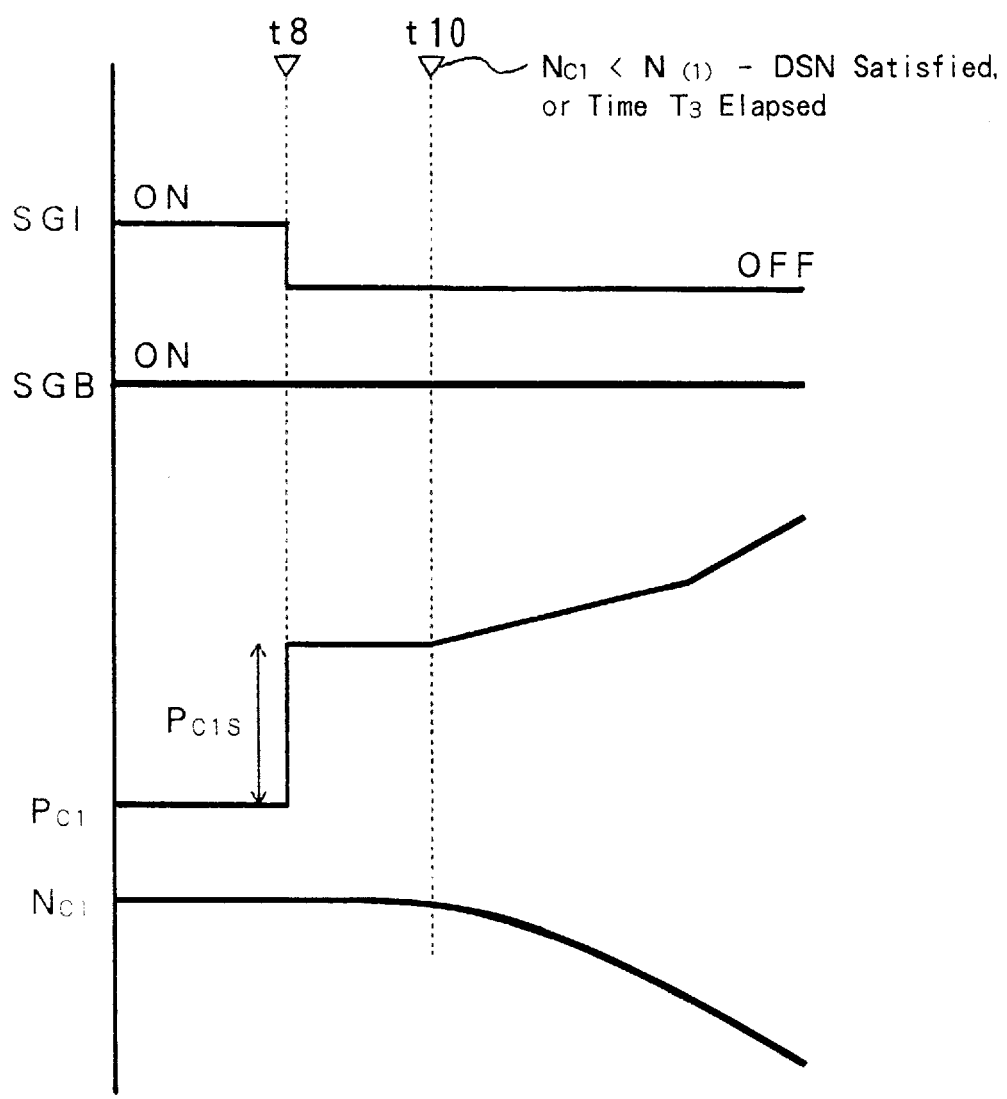
FIG. 23 is a time chart of changes in the C-1 oil pressure in a second control mode.

If the vehicle is started from a stalled state, on the other hand, the C-1 oil pressure $P_{Cl}$ is raised according to the second mode, as illustrated in FIG. 23, to accelerate the rise and to thereby prevent the delay in the engagement of the first clutch C1.

Specifically, if the accelerator pedal is depressed at the time t8 to turn OFF the idle signal SGI when the accelerator pedal is released and the brake pedal is depressed to turn ON the idle signal SGI and the brake signal SGB, the C-1 oil pressure $P_{Cl}$ is raised by the constant $P_{Cls}$. In this case, the constant $P_{Cls}$ is set to a larger value than that for the case in which the vehicle is started from the idle state. After this, if either (1) the input side RPM $N_{Cl}$ becomes smaller at time t10 than the difference obtained by subtracting the constant DSN from the value $N_{(1)}$, or (2) the time period T3 has elapsed, the C-1 oil pressure $P_{Cl}$ is further raised by the constant $P_{Clp}$ to effect the sweep-up. As a result, delay in the engagement of the first clutch is avoided so that the application shock can be prevented.

Figure 24:
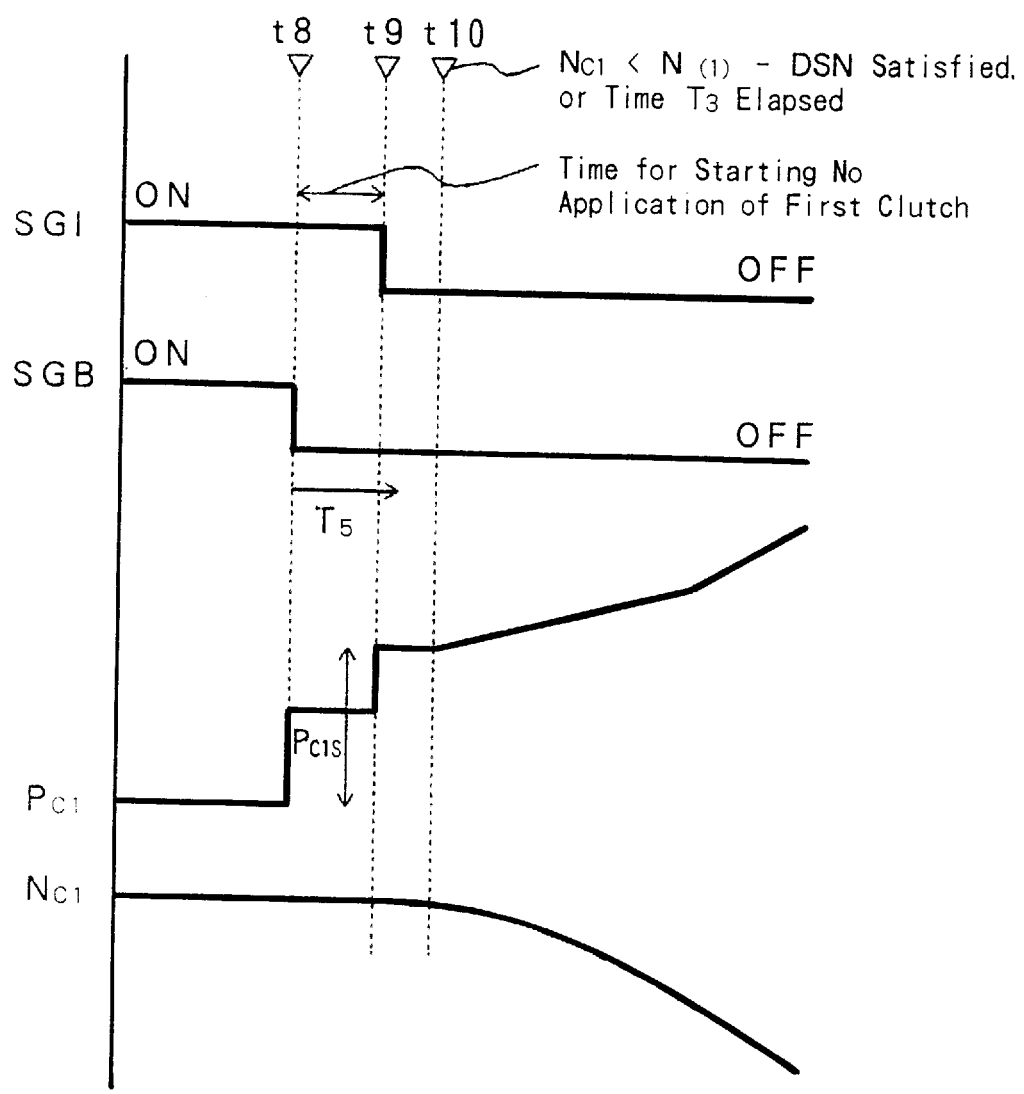
FIG. 24 is a time chart illustrating the state at the time of changing from the first mode to the second mode for control of the C-1 oil pressure in accordance with the present invention.

Moreover, if the accelerator pedal is depressed with a slight delay after the brake pedal has been released, the C-1 oil pressure $P_{Cl}$ is raised according to the first mode, as illustrated in FIG. 24, and then at a higher rate according to the second mode by the depression of the accelerator pedal so that delay in the engagement of the first clutch C1 is prevented.

Specifically, if the brake pedal is released at time t8 to turn OFF the brake signal SGB when the accelerator pedal is released and the brake pedal is depressed so that both the idle signal SGI and the brake signal SGB are ON, the C-1 oil pressure $P_{Cl}$ is raised by the constant $P_{Cl}S$. Moreover, if the accelerator pedal is depressed at time t9 prior to the time the engagement of the first clutch C1 has started (that is, before lapse of time period time $T_4$ following release of the brake pedal) to turn OFF the idle signal SGI, the constant $P_{Cls}$ is changed to a larger value. After this, if either (1) the clutch input side RPM $N_{Cl}$ becomes smaller at the time t10 than the difference obtained by subtracting the constant DSN from the value $N_{(1)}$, or (2) the time period $T_3$ has elapsed, the C-1 oil pressure $P_{Cl}$ is further raised by the constant $P_{Clp}$ to effect the sweep-up. As a result, delay in the engagement of the first clutch C1 is avoided so that the application shock can be prevented. Thus, the delay in the engagement of the first clutch C1 is avoided no matter how the driver might operate the brake pedal and the accelerator pedal, so that application shock is prevented.

Step 3-1: The clutch input side RPM $N_{Cl}$ at the instant when the ending condition of the in-neutral control is satisfied is stored as the value $N_{(1)}$ in the memory of the automatic transmission control unit 41 (FIG. 2).

Step 3-2: The timing of a third timer is started. This third timer is set with different values depending upon the ON/OFF of a flag FL, in a manner to correspond to the time before the engagement of the first clutch C1 is started. Incidentally, in the present embodiment, if the vehicle is started from the idle state, the flag FL is turned OFF so that the third timer is set to 0.2 secs. On the other hand, if the vehicle is started from the stall state and if the accelerator pedal is depressed with a slight delay after the brake pedal has been released, the flag FL is turned ON so that the third timer is then set to 0.1 secs.

Step 3-3: It is decided whether or not the accelerator pedal is released to the extent of idle OFF. The routine advances to Step 3-4, if in the idle OFF, and to Step 3-5 if NOT.

Step 3-4: The flag FL is turned ON.

Step 3-5: It is decided whether or not the brake pedal is released to the extent of brake OFF. The routine advances to Step 3-6, if in the brake OFF, and to Step 3-10 if NOT.

Step 3-6: It is decided whether or not a fourth timer is in operation. The routine advances to Step 3-8, if the fourth timer is in its timing operation, and to Step 3-7 if NOT.

Step 3-7: The timing operation of the fourth timer is started.

Step 3-8: The engagement start detecting means 104 (FIG. 1) of the automatic transmission control unit 41 decides whether or not the time period $T_4$ has elapsed. The routine advances to Step 3-10, if the time period $T_4$ has elapsed, and to Step 3-9 if the time period $T_4$ has not elapsed.

In this case, the time period is that between release of the brake pedal and start of the engagement of the first clutch C1, but the engagement start detecting means 104 utilizes its detection by the fourth timer to determine that the engagement of the first clutch C1 has not started. As a result, the structure of the automatic transmission control unit 41 can be simplified, without delay in detection. In addition it is possible to decide accurately whether or not the engagement of the first clutch C1 has started.

Here, the time period $T_4$ to be set in the fourth timer is 0.1 secs, corresponding to the state in which the engagement of the first clutch C1 has not started. As a result, the time period $T_4$ is shorter than the time (i.e., the time period $T_3$ to be set in the third timer) before the engagement of the first clutch C1 is started, so that the state, in which the engagement is not started, can be detected.

Step 3-9: It is decided whether or not the accelerator pedal is released to the extent of idle OFF. The subroutine advances to Step 3-4, if in the idle OFF, and to Step 3-10 if not in the idle OFF.

Step 3-10: The flag FL is turned OFF.

Step 3-11: With reference to the first map of FIG. 20, the constant $P_{Cls}$ is read in as a shelf pressure set to correspond to the throttle opening θ and the ON/OFF of the flag FL. Incidentally, the constant $P_{Cls}$ is set to a value as can move the piston of the hydraulic servo C-1 (FIG. 5) without fail and reduce the application shock generated by the engagement.

Specifically, when the vehicle is to be started from the idle state, the constant $P_{Cls}$ is set to a small value so as to raise the C-1 oil pressure $P_{Cl}$ gently according to the first mode. When the vehicle is to be started from the stall state, on the other hand, the constant $P_{Cls}$ is set to a large value so as to raise the C-1 oil pressure $P_{Cl}$ according to the second mode to thereby accelerate the rise. Moreover, when the accelerator pedal is depressed with a slight delay after the brake pedal has been released, the constant $P_{Cls}$ is made small until the accelerator pedal is depressed, so that the C-1 oil pressure $P_{Cl}$ may be raised according to the first mode and then according to the second mode. After the accelerator pedal has been depressed, the constant $P_{Cls}$ is made large so as to accelerate the rise.

As the throttle opening θ increases, on the other hand, the constant $P_{Cls}$ is increased. As a result, the first clutch C1 can be applied in a manner to correspond to the magnitude of the input torque so that delay in the engagement can be prevented in a manner to correspond to the magnitude of the input torque.

Step 3-12: The constant $P_{Cls}$ is added to the reference C-1 oil pressure $P_{Clm}$ as the base pressure set at Step 2-10 and Step S2-15, and the sum is set as the C-1 oil pressure $P_{Cl}$.

As a result, when the driver shifts the vehicle from a stop to a start stage, the constant $P_{Cls}$ is added to the reference C-1 oil pressure $P_{Clm}$ so that the oil pressure fed to the hydraulic servo C-1 is raised to bring the first clutch C1 into partial engagement. Subsequently, the oil pressure fed to the hydraulic servo C-1 is further raised to bring the first clutch C1 into complete engagement.

Step 3-13: It is decided whether or not the clutch input side RPM $N_{Cl}$ is smaller than the difference obtained by subtracting the constant DSN from the value $N_{(1)}$. The routine advances to Step 3-15, if the clutch input side RPM $N_{Cl}$ is smaller than the difference obtained by subtracting the constant DSN from the value $N_{(1)}$, and to Step 3-14 if the clutch input side RPM $N_{Cl}$ is larger than the difference obtained by subtracting the constant DSN from the value $N_{(1)}$.

Step 3-14: It is decided whether or not the time period $T_3$ has elapsed. The subroutine advances to Step 3-15, if the time period $T_3$ has elapsed, but returns to Step 3-3 if NOT.

Step 3-15: The timing operation of a fifth timer is started.

Step 3-16: The 1st speed shift signal is generated.

Step 3-17: With reference to the map of FIG. 21, the constant $P_{Clp}$ is read, which constant is set to correspond to the throttle opening θ and the measured time TP of the fifth timer. Incidentally, the constant $P_{Clp}$ is increased as the measured time TP and the throttle opening θ increase. Therefore, the gradient of the C-1 oil pressure $P_{Cl}$ is made larger for a larger throttle opening θ. As a result, the first clutch C1 can be applied in a manner to correspond to the magnitude of the input torque so that application shock can be prevented.

In this case, the setting of the constant $P_{Clp}$ is the same in the first mode as in the second mode. As a result, after the engagement of the first clutch C1 has been started, the oil pressure for the second mode can be gently raised as in the first mode so that the engagement of the first clutch C1 is smooth.

Step 3-18: The constants $P_{Cls}$ and $P_{Clp}$ are added to the reference C-1 oil pressure $P_{Cl}m$, and the sum is set as the C-1 oil pressure $P_{Cl}$.

Step 3-19: It is decided whether or not the clutch input RPM $N_{Cl}$ is smaller than a constant DEN. The routine advances to Step 3-20, if the clutch input RPM $N_{Cl}$ is smaller than the constant DEN, but returns to Step 3-17 if the clutch input RPM $N_{Cl}$ exceeds the constant DEN.

Step 3-20: It is decided whether or not the sixth timer is in its timing operation. The subroutine advances to Step 3-22, if the sixth timer is in operation, but to Step 3-21 if NOT.

Step 3-21: The timing operation of the sixth timer is started.

Step 3-22: It is decided whether or not a time period $T_6$ has elapsed. The subroutine advances to Step 3-23, if the time $T_6$ has elapsed, but returns to Step 3-17 if NOT.

Step 3-23: The third solenoid signal S3 is turned OFF.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission mounted in a vehicle, comprising:

a clutch applied when a forward running range is selected, for transmitting the rotation of an engine to a speed change unit;

a hydraulic servo for applying the clutch responsive to feed of an oil pressure; and a control unit for controlling the oil pressure fed to the hydraulic servo, said control unit including:

stop state detecting means for detecting satisfaction of a set of conditions defining a stop state for the vehicle, said conditions including a vehicle speed of substantially zero, a released accelerator pedal and a depressed brake pedal;

release means for bringing the clutch into a substantially released state by lowering the oil pressure feed to the hydraulic servo responsive to detection of the vehicular stop state;

application means for applying the clutch, responsive to detection that the vehicular stop state conditions are not satisfied, while in said substantially released state; and engagement start detecting means for detecting whether or not the engagement of the clutch has started, and wherein said application means raises the oil pressure fed to the hydraulic servo, according to a first mode, responsive to detection that the vehicular stop state conditions are not satisfied, with both the brake pedal and the accelerator pedal released, and according to a second mode, in which the rate of increase in the oil pressure is higher than that of the first mode, responsive to detection that the vehicular stop state conditions are not satisfied, with the accelerator pedal depressed, and according to the second mode in preference to the first mode, responsive to detection, while the vehicular stop state conditions are not satisfied with both the brake pedal and the accelerator pedal released, that the accelerator pedal has been depressed while the engagement of the clutch has not started.

2. A control system for an automatic transmission according to claim 1, wherein the engagement start detecting means decides that the engagement of the clutch has not started until lapse of a time period from the start of the feed of oil pressure to the hydraulic servo predetermined for start of the engagement of the clutch.

3. A control system for an automatic transmission according to claim 1, wherein, in the first mode, a first constant shelf pressure is generated by the time the engagement of the clutch has started, and the oil pressure to said hydraulic servo is then raised from said first shelf pressure at a constant gradient for engagement of the clutch, and wherein in the second mode, a second constant shelf pressure higher than said first shelf pressure is generated, and the oil pressure is then raised from said second shelf pressure at a constant gradient for engagement of the clutch.

4. A control system for an automatic transmission according to claim 3, wherein said first and second shelf pressures are raised as throttle opening increases, and wherein said gradients in the first and second modes are made steeper as the throttle opening increases.

* * * * *

UNITED STATES PATENT AND TRADEMARK OFFICE
CERTIFICATE OF CORRECTION

PATENT NO. : 5,772,553
DATED : June 30, 1998
INVENTOR(S) : TSUKAMOTO et al

It is certified that error appears in the above-indentified patent and that said Letters Patent is hereby corrected as shown below:

Col. 5, line 33, "S1" should read --$S_1$--; and
line 34, "P2" should read --$P_2$--.

Col. 6, line 17, "A" should read --$\Delta$--.

Col. 9, line 19, "NE" should read --$N_E$--.

Col. 10, line 62, "NC$_1$" should read --$N_{C1}$--.

Col. 11, line 1, "AN" should read --$\Delta N$--.

Col. 12, line 15, "$\Delta$N" should read --$\Delta N_m$--.

Signed and Sealed this

Thirtieth Day of March, 1999

Attest:

Q. TODD DICKINSON

*Attesting Officer*   *Acting Commissioner of Patents and Trademarks*